US008806438B2

(12) United States Patent
Bates

(10) Patent No.: US 8,806,438 B2
(45) Date of Patent: Aug. 12, 2014

(54) COLLABORATIVE SOFTWARE DEBUGGING IN A DISTRIBUTED SYSTEM WITH VARIABLE-SPECIFIC MESSAGES

(75) Inventor: Cary L. Bates, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 257 days.

(21) Appl. No.: 13/090,494

(22) Filed: Apr. 20, 2011

(65) Prior Publication Data

US 2012/0272216 A1 Oct. 25, 2012

(51) Int. Cl.
*G06F 9/44* (2006.01)

(52) U.S. Cl.
USPC .......................................................... 717/125

(58) Field of Classification Search
None
See application file for complete search history.

(56) References Cited

U.S. PATENT DOCUMENTS

| | | | |
|---|---|---|---|
| 5,819,093 A | 10/1998 | Davidson et al. | |
| 6,002,871 A | 12/1999 | Duggan et al. | |
| 6,026,362 A | 2/2000 | Kim et al. | |
| 6,042,614 A | 3/2000 | Davidson et al. | |
| 6,058,393 A | 5/2000 | Meier et al. | |
| 6,293,712 B1 | 9/2001 | Coutant | |
| 6,324,683 B1 * | 11/2001 | Fuh et al. | 717/124 |
| 6,493,868 B1 | 12/2002 | DaSilva et al. | |
| 6,658,650 B1 | 12/2003 | Bates | |
| 6,901,582 B1 | 5/2005 | Harrison | |
| 6,961,926 B2 | 11/2005 | Koyama | |
| 6,964,036 B2 | 11/2005 | Bates et al. | |
| 7,028,291 B2 | 4/2006 | Sumida et al. | |
| 7,055,137 B2 | 5/2006 | Mathews | |
| 7,185,319 B2 | 2/2007 | Kaler et al. | |
| 7,216,336 B1 | 5/2007 | Ezra et al. | |
| 7,222,264 B2 | 5/2007 | Muratori et al. | |
| 7,328,242 B1 | 2/2008 | McCarthy et al. | |
| 7,331,049 B1 | 2/2008 | Jin | |
| 7,343,586 B1 | 3/2008 | Hernandez | |
| 7,437,614 B2 | 10/2008 | Haswell et al. | |

(Continued)

FOREIGN PATENT DOCUMENTS

EP 1378 833 A1 1/2004

OTHER PUBLICATIONS

IBM, "Method And Apparatus For Multi-Party Collaborative Debugging Of Java Applications", IP.com Prior Art Database, Jul. 7, 2009, pp. 1-5, USA.

(Continued)

*Primary Examiner* — Anna Deng
(74) *Attorney, Agent, or Firm* — Biggers Kennedy Lenart Spraggins LLP

(57) ABSTRACT

In a distributed system that includes a debug server and debug clients coupled for communications through a data communications network, where the debug server includes a debug administrator, a message router, a back-end debugger, and a debuggee, collaborative software debugging includes: receiving application-level messages, including receiving, from a requesting debug client, a request to establish a variable-specific message for a particular variable; routing the application-level messages among the debug clients, the debug administrator, and the back-end debugger, including establishing the variable-specific message; and returning, to the debug clients, client-specific debug results, including: responsive to each request by a variable evaluating debug client to evaluate a variable and if a variable-specific message has been established for the variable to be evaluated, returning the content of the variable-specific message to be displayed in association with the variable in the variable evaluating debug client's client-specific GUI along with the evaluation of the variable.

18 Claims, 12 Drawing Sheets

(56) References Cited

U.S. PATENT DOCUMENTS

| | | | |
|---|---|---|---|
| 7,519,960 B2 | 4/2009 | Mei et al. |
| 7,530,053 B2 | 5/2009 | Pugh et al. |
| 7,607,124 B2 | 10/2009 | Gooty et al. |
| 7,634,760 B1 | 12/2009 | Gumtow et al. |
| 7,634,761 B2 | 12/2009 | Buschardt et al. |
| 7,673,180 B1 | 3/2010 | Chen et al. |
| 7,676,755 B2 | 3/2010 | Huang et al. |
| 7,721,265 B1 | 5/2010 | Xu et al. |
| 7,774,703 B2 | 8/2010 | Junuzovic et al. |
| 7,840,849 B2 | 11/2010 | O'Callahan |
| RE42,153 E | 2/2011 | Hubbard et al. |
| 7,890,931 B2 | 2/2011 | Lauzon et al. |
| 7,992,133 B1 | 8/2011 | Theroux et al. |
| 8,041,553 B1 | 10/2011 | Hernandez et al. |
| 8,171,346 B2* | 5/2012 | Stairs et al. ............... 714/38.1 |
| 8,412,813 B2 | 4/2013 | Carlson et al. |
| 2001/0004766 A1 | 6/2001 | Koyama |
| 2002/0066071 A1 | 5/2002 | Tien et al. |
| 2002/0104071 A1 | 8/2002 | Charisius et al. |
| 2003/0046612 A1* | 3/2003 | Grey ............................. 714/38 |
| 2003/0056198 A1 | 3/2003 | Ai-Azzawe et al. |
| 2003/0084430 A1 | 5/2003 | Bates et al. |
| 2003/0088854 A1 | 5/2003 | Wygodny et al. |
| 2003/0098879 A1 | 5/2003 | Mathews |
| 2003/0101379 A1 | 5/2003 | Bates et al. |
| 2003/0131342 A1 | 7/2003 | Bates et al. |
| 2003/0221185 A1 | 11/2003 | Bates et al. |
| 2003/0221186 A1 | 11/2003 | Bates et al. |
| 2005/0028107 A1* | 2/2005 | Gomes et al. ................. 715/762 |
| 2005/0034103 A1 | 2/2005 | Volkov |
| 2005/0060689 A1 | 3/2005 | Bates et al. |
| 2005/0193264 A1 | 9/2005 | Khan et al. |
| 2005/0198204 A1 | 9/2005 | Takahashi |
| 2005/0210335 A1 | 9/2005 | Muratori et al. |
| 2005/0289396 A1 | 12/2005 | Hooper et al. |
| 2006/0036692 A1 | 2/2006 | Morinigo et al. |
| 2006/0129988 A1 | 6/2006 | Calsyn et al. |
| 2006/0129993 A1 | 6/2006 | Belisario et al. |
| 2007/0006150 A9 | 1/2007 | Walmsley |
| 2007/0050452 A1 | 3/2007 | Raju |
| 2007/0168301 A1 | 7/2007 | Eisner et al. |
| 2007/0168972 A1 | 7/2007 | Bates et al. |
| 2007/0168994 A1 | 7/2007 | Barsness et al. |
| 2007/0276692 A1* | 11/2007 | Mei et al. ........................... 705/1 |
| 2008/0005235 A1 | 1/2008 | Hegde et al. |
| 2008/0052670 A1 | 2/2008 | Espinosa et al. |
| 2008/0127113 A1 | 5/2008 | Wu et al. |
| 2008/0127117 A1 | 5/2008 | Panchamukhi et al. |
| 2008/0134018 A1 | 6/2008 | Kembel et al. |
| 2008/0141222 A1 | 6/2008 | Alpern |
| 2008/0155505 A1 | 6/2008 | Lin et al. |
| 2008/0189681 A1 | 8/2008 | Bhogal et al. |
| 2008/0209405 A1 | 8/2008 | Roberts et al. |
| 2008/0229284 A1 | 9/2008 | Castro et al. |
| 2008/0229285 A1 | 9/2008 | Housser |
| 2008/0244418 A1 | 10/2008 | Manolescu et al. |
| 2009/0007072 A1 | 1/2009 | Singhal et al. |
| 2009/0007074 A1 | 1/2009 | Campion et al. |
| 2009/0037775 A1* | 2/2009 | Chi et al. ......................... 714/38 |
| 2009/0082008 A1 | 3/2009 | Thorell |
| 2009/0138858 A1 | 5/2009 | Livshits et al. |
| 2009/0199161 A1 | 8/2009 | Cutler |
| 2009/0254883 A1 | 10/2009 | Munson et al. |
| 2009/0254888 A1 | 10/2009 | Nicholls et al. |
| 2009/0282043 A1 | 11/2009 | Dharmavaram et al. |
| 2009/0307783 A1* | 12/2009 | Maeda et al. .................... 726/30 |
| 2010/0042975 A1 | 2/2010 | Schneider et al. |
| 2010/0057865 A1 | 3/2010 | Chan et al. |
| 2010/0083232 A1 | 4/2010 | Chouinard et al. |
| 2010/0100690 A1 | 4/2010 | Rajamani et al. |
| 2010/0153696 A1 | 6/2010 | Beachem et al. |
| 2010/0153921 A1* | 6/2010 | Klein ............................. 717/124 |
| 2010/0162049 A1 | 6/2010 | Stall et al. |
| 2010/0205583 A1 | 8/2010 | Gebhardt et al. |
| 2010/0235815 A1 | 9/2010 | Maybee et al. |
| 2010/0242026 A1 | 9/2010 | Bates et al. |
| 2010/0253781 A1 | 10/2010 | Sasson et al. |
| 2010/0306730 A9 | 12/2010 | Carlson et al. |
| 2010/0332212 A1 | 12/2010 | Finkelman |
| 2010/0332584 A1 | 12/2010 | Koul et al. |
| 2011/0004701 A1 | 1/2011 | Panda et al. |
| 2011/0047415 A1 | 2/2011 | Nanjundaswamy |
| 2011/0088015 A1 | 4/2011 | Shillington et al. |
| 2011/0131295 A1 | 6/2011 | Jolfaei |
| 2011/0138366 A1 | 6/2011 | Wintergerst et al. |
| 2011/0142035 A1 | 6/2011 | Ku et al. |
| 2011/0154295 A1 | 6/2011 | Aharoni et al. |
| 2011/0179180 A1 | 7/2011 | Schleifer et al. |
| 2011/0191752 A1 | 8/2011 | Cieraux et al. |
| 2011/0197179 A1 | 8/2011 | Kratochvil |
| 2011/0202901 A1 | 8/2011 | Givoni et al. |
| 2011/0214109 A1 | 9/2011 | Pedersen |
| 2011/0225460 A1 | 9/2011 | Stairs et al. |
| 2011/0258614 A1 | 10/2011 | Tamm |
| 2011/0307871 A1 | 12/2011 | Branda et al. |
| 2012/0047486 A1* | 2/2012 | Ashish et al. ................. 717/106 |
| 2012/0054276 A1 | 3/2012 | Chaturvedi et al. |
| 2012/0084753 A1 | 4/2012 | Maybee et al. |
| 2012/0159452 A1 | 6/2012 | Deline et al. |
| 2012/0233588 A1 | 9/2012 | Mruthyunjaya et al. |

OTHER PUBLICATIONS

IBM, "Method And Apparatus For Parallelized Debugging", IP.com Prior Art Database, Apr. 28, 2009, pp. 1-8, USA.
Wen et al., "dIP: A Non-Intrusive Debugging IP For Dynamic Data Race Detection In Many-core", 10th International Symposium on Pervasive Systems, Algorithms, and Networks, Dec. 2009, pp. 1-6, IEEE Computer Society, Kaohsiung, Taiwan.
Wang et al., "A Dual-Mode Exerciser For A Collaborative Computing Environment", 11th Asia-Pacific Software Engineering Conference (APSEC '04) Nov. 30-Dec. 3, 2004, pp. 1-9, IEEE Computer Society, Busan, Korea.
Office Action, U.S. Appl. No. 12/943,581, Oct. 4, 2012.
U.S. Appl. No. 13/090,503, Apr. 20, 2011.
U.S. Appl. No. 13/170,435, Jun. 28, 2011.
U.S. Appl. No. 13/090,546, Apr. 20, 2011.
U.S. Appl No. 13/090,556, Apr. 20, 2011.
U.S. Appl. No. 13/090,494, Apr. 20, 2011.
U.S. Appl. No. 13/093,895, Apr. 26, 2011.
Kishori Mundargi, Programming in C Chapter 8: Structures and Unions, 2003.
Office Action, U.S. Appl. No. 12/908,223, Feb. 15, 2013.
Office Action, U.S. Appl. No. 12/908,099, Dec. 20, 2012.
Office Action, U.S. Appl. No. 13/090,556, Dec. 26, 2012.
Office Action, U.S. Appl. No. 13/090,494, Mar. 28, 2013.
Bani-Salameh, H., et al. "Integrating Collaborative Program Development And Debugging Within A Virtual Environment", R.O. Briggs et al. (Eds.): CRIWG 2008, LNCS 5411, pp. 107-120, 2008. Springer-Verlag Berlin Heidelberg 2008.
Mozilla Pastebin, "Mozilla Pastebin-collaborative debugging tool," http://pastebin.mozilla.org/?help=1, accessed Aug. 24, 2010, 2 pages.
Handley, "SIP: Session Initiation Protocol" RFC 2543, Handley et. al, 1999.
Roach, "Session Initiation Protocol (SIP)—Specific Event Notification", RFC 3265, Roach,2002.
Cheng, Proceeding eclipse '03 Proceedings of the 2003 OOPSLA workshop on eclipse technology eXchange pp. 45-49, ACM New York, NY, USA, 2003.
Dao, "Live Debugging of Distributed Systems", Dao et al., 0. de Moor and M. Schwartzbach (Eds.): CC 2009, LNCS 5501, pp. 94-108, 2009.
Wong, et al., "CONFER: Towards Groupware for Building Consensus in Collaborative Software Engineering", Copyright © 2007, Australian Computer Society, Inc., pp. 1-8.
Office Action, U.S. Appl. No. 12/897,921, May 17, 2013.
Office Action, U.S. Appl. No. 12/908,963, May 13, 2013.
Final Office Action, U.S. Appl. No. 12/908,223, May 29, 2013.
Final Office Action, U.S. Appl. No. 12/908,990, Sep. 10, 2013.

(56) References Cited

OTHER PUBLICATIONS

Office Action, U.S. Appl. No. 12/908,990, May 13, 2013.
Final Office Action, U.S. Appl. No. 12/908,099, Jul. 5, 2013.
Office Action, U.S. Appl. No. 12/908,945, Jun. 4, 2013.
Office Action, U.S. Appl. No. 12/909,028, May 24, 2013.
Office Action, U.S. Appl. No. 12/943,620, Jun. 20, 2013.
Office Action, U.S. Appl. No. 12/908,942, May 31, 2013.
Office Action, U.S. Appl. No. 13/090,503, May 8, 2013.
Office Action, U.S. Appl. No. 13/170,435, May 8, 2013.
Final Office Action, U.S. Appl. No. 13/090,546, Sep. 12, 2013.
Office Action, U.S. Appl. No. 13/090,546, Apr. 26, 2013.
Final Office Action, U.S. Appl. No. 13/090,556, Apr. 26, 2013.
Final Office Action, U.S. Appl. No. 13/090,494, Aug. 6, 2013.
Office Action, U.S. Appl. No. 13/093,895, Jun. 7, 2013.
Office Action, U.S. Appl. No. 12/943,339, Sep. 27, 2013.
Reeves, M., et al., "Moomba—A Collaborative Environment for Supporting Distributed Extreme Programming in Global Software Development," Lecture Notes in Computer Science, 5th International Conference, XP 2004, Garmisch-Partenkirchen, Germany, Jun. 6-10, 2004. Proceedings, Jun. 2004, pp. 38-50, Series vol. 3092, Springer Berlin Heidelberg. DOI: 10.1007/978-3-540-24853-8_5.
Chen, L., et al., "Building Collaboration into IDEs," Magazine Queue—Distributed Development, Dec./Jan. 2003-2004, pp. 40-50, vol. 1, Issue 9, ACM New York, NY, USA. DOI: 10.1145/966789.966803.
Sandusky, R., et al., "Negotiation and the Coordination of Information and Activity in Distributed Software Problem Management," GROUP '05 Proceedings of the 2005 international ACM SIGGROUP conference on Supporting group work, Month: Unknown, Year: 2005, pp. 187-196, ACM New York, NY, USA. DOI: 10.1145/1099203.1099238.
Schümmer, T., et al., "Supporting the Social Practices of Distributed Pair Programming," Groupware: Design, Implementation, and Use, 14th International Workshop, CRIWIG 2008, Omaha, NE, USA, Sep. 14-18, 2008, Revised Selected Papers, Lecture Notes in Computer Science, Sep. 2008, pp. 83-98, Series vol. 5411, Springer Berlin Heidelberg. DOI: 10.1007/978-3-540-92831-7_8.
Wang, C., et al., "A Dual-mode Exerciser for a Collaborative Computing Environment," Software Engineering Conference, 2004. 11th Asia-Pacific, Nov. 30-Dec. 3, 2004, pp. 240-248, IEEE Xplore, DOI: 10.1109/APSEC.2004.3.
Harris, A., "Performance Tuning, Configuration, and Debugging," 2010, Apress, Pro ASP .NET 4 CMS, Advanced Techniques for C# Developers Using the .NET 4 Framework, Month: Unknown, Year: 2010, pp. 229-256, Apress. DOI: 10.1007/978-1-4302-2713-7_8.

\* cited by examiner

COLLABORATIVE SOFTWARE DEBUGGING IN A DISTRIBUTED SYSTEM WITH VARIABLE-SPECIFIC MESSAGES

BACKGROUND OF THE INVENTION

1. Field of the Invention

The field of the invention is data processing, or, more specifically, methods, apparatus, and products for collaborative software debugging in a distributed system.

2. Description of Related Art

Software source code is increasingly complex and is often developed by various developers, sometimes physically dispersed from one another. One part of software development, source code debugging, is especially complex in today's distributed software development environments. In debugging, it is often useful for two or more developers to work together in real-time to debug the source code. Further, during such debugging, developers may have differing interests in different portions of the source code. At present, there are no debug engines available that enable remotely distributed developers to debug the same source code collaboratively in real-time, while separately viewing different results of the same debugging.

SUMMARY OF THE INVENTION

Methods, apparatus, and products for collaborative software debugging in a distributed system are disclosed. In embodiments of the present invention, the distributed system includes a debug server, a plurality of debug clients, and a data communications network. The debug server is coupled for data communications to the plurality of debug clients through the data communications network and the debug server includes a debug administrator, a message router, a back-end debugger, and a debuggee. From the perspective of the debug server, collaborative software debugging in the distributed system includes: receiving, by the debug server from the debug clients asynchronously during a debug session of the debuggee, a plurality of application-level messages, including receiving, from a requesting debug client, a request to establish a variable-specific message for a particular variable, the variable-specific message comprising content to be displayed in association with the particular variable in a debug client's client-specific graphical user interface ('GUI') upon evaluation of the particular variable; routing, by the message router in accordance with an application-level message passing protocol, the application-level messages among the debug clients, the debug administrator, and the back-end debugger, thereby providing distributed control of the back-end debugger to the debug clients with application-level messages routed to the back-end debugger, including establishing the variable-specific message for the particular variable; and returning, by the debug server to the debug clients in response to the application-level messages routed to the back-end debugger, client-specific debug results, including: responsive to each request by a variable evaluating debug client to evaluate a variable and if a variable-specific message has been established for the variable to be evaluated, returning, by the message router to the variable evaluating debug client, the content of the variable-specific message to be displayed in association with the variable in the variable evaluating debug client's client-specific GUI along with the evaluation of the variable.

From the perspective of the debug clients, collaborative software debugging in accordance with embodiments of the present invention includes: presenting, by each debug client to a user of the debug client, a client-specific graphical user interface ('GUI'), the client-specific GUI comprising a client-specific display of a debug session of the debuggee; detecting, by each debug client, user input through the client-specific GUI, including detecting, by a requesting debug client, user input establishing a variable-specific message for a particular variable, the variable-specific message comprising content to be displayed in association with the particular variable in a debug client's client-specific GUI upon evaluation of the particular variable; generating, by each debug client in dependence upon the detected user input, one or more application-level messages, including generating a request to establish the variable-specific message for the particular variable; sending, by each debug client, the application-level messages to the debug server, including sending the request to establish the variable-specific message for the particular variable to the debug server; receiving, by each debug client responsive to the application-level messages, client-specific debug results, including receiving, by a variable evaluating debug client responsive to the variable evaluating debug client's request to evaluate the particular variable, the content of the variable-specific message along with the evaluation of the particular variable; and displaying, by each debug client in the client-specific GUI, the client-specific debug results, including displaying, by the variable evaluating debug client, in association with the particular variable the content of the variable-specific message along with the evaluation of the particular variable.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
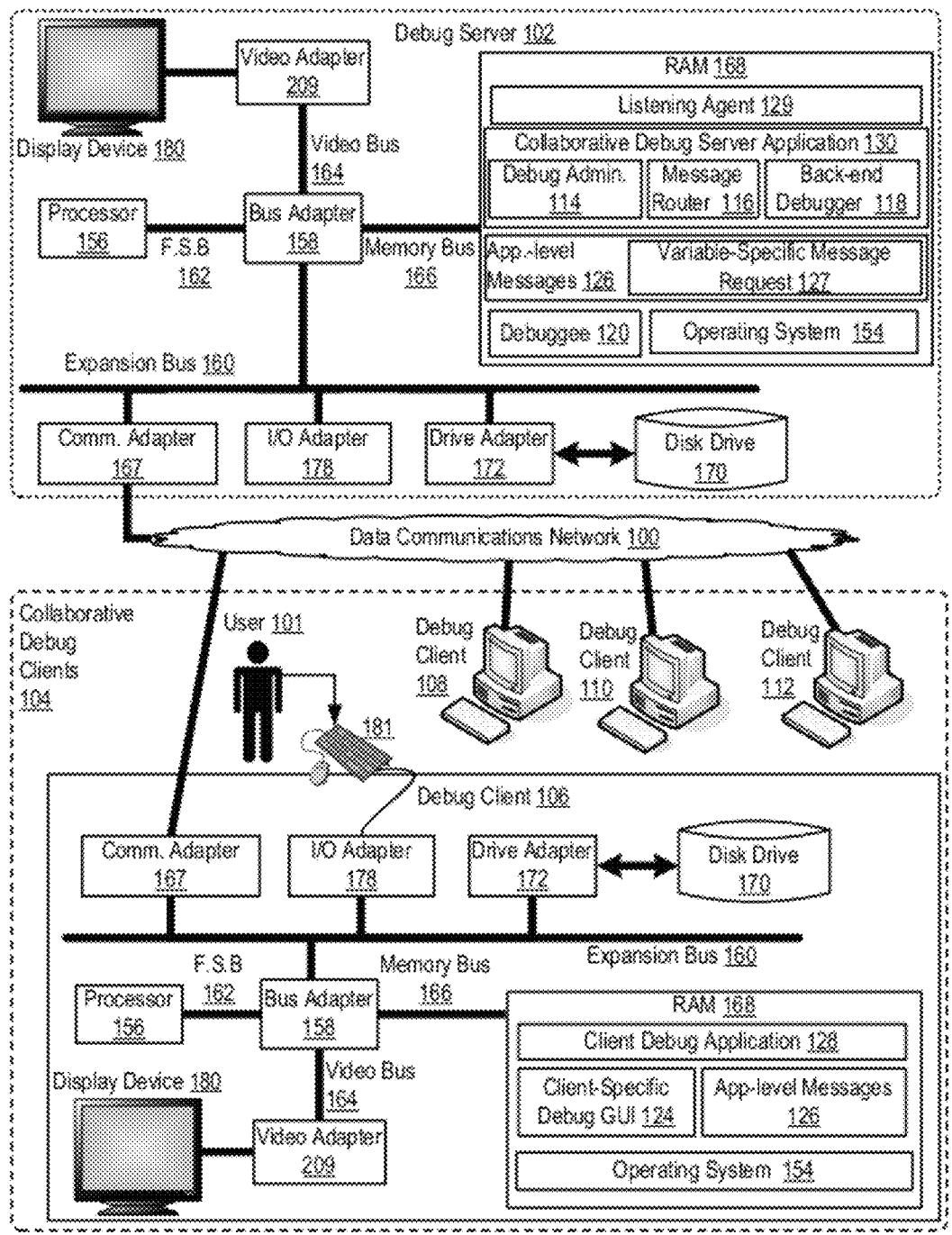
FIG. 1 sets forth a network diagram of a distributed system in which collaborative software debugging is carried out according to embodiments of the present invention.

Exemplary methods, apparatus, and products for collaborative software debugging in a distributed system in accordance with the present invention are described with reference to the accompanying drawings, beginning with FIG. 1. FIG. 1 sets forth a network diagram of a distributed system in which collaborative software debugging is carried out according to embodiments of the present invention. The term 'debug,' and its variations—debugged, debugging, and so on—as used in this specification generally refers to a methodical process of finding and reducing the number of bugs, or defects, in a computer program, that is, in source code of the computer program. Debugging may also be carried out to produce other results—decrease source code size, increase efficiency of the source code, decrease memory use by the executed source code, and so on as will occur to readers of skill in the art. The source code of a software program or application being debugged is referred to in this specification as a 'debuggee.'

The system of FIG. 1 is a distributed system. The term 'distributed' generally describes a system in which elements of the system are coupled for data communications through a data communications network, in many cases, a loosely-coupled data communications network. The distributed system of FIG. 1, for example, includes a debug server (102), a plurality of debug clients (104), and a data communications network (100). The debug server (102) in the example distributed system of FIG. 1 is coupled for data communications to the plurality of debug clients (104) through the data communications network (100). The term 'distributed' may also refer, as context requires, to the physical distribution of the debug clients (104). That is, each debug client (106, 108, 110, and 112) may physically remote from each of the other debug clients. Clients (106 and 108) may be located in different states in the United States, while client (110) may be located in China, and client (112) may be located in Japan. The plurality of clients (104) is 'distributed' physically in various locations.

In the distributed system of FIG. 1, each of the debug clients (106, 108, 110, and 112) and the debug server (102) is implemented as automated computing machinery, a computer. For clarity of explanation, not limitation, the components comprising the debug server (102) are similar to and bear the same numbers as corresponding components comprising each of the debug clients (104). Similar components may be described below with respect to only one of the debug server (102) or a debug client, but such descriptions applies to components of both the debug server and the debug client.

Each of the debug clients (106, 108, 110, 112) of FIG. 1 includes at least one computer processor (156) or 'CPU' as well as random access memory (168) ('RAM') which is connected through a high speed memory bus (166) and bus adapter (158) to processor (156) and to other components of the debug clients (106, 108, 110, 112). The debug server (102) includes similar components coupled in similar ways.

Stored in RAM (168) of each debug client (106, 108, 110, 112) is a client debug application (128), a module of computer program instructions that, when executed by the computer processor (156) of the debug client, causes the debug client to carry out client-side collaborative software debugging in accordance with embodiments of the present invention. The client debug application (128) of each debug client, say client (106) as an example, carries out client-side collaborative software debugging in accordance with embodiments of the present invention by: presenting, by the debug client (106) to a user (not shown) of the debug client (106), a client-specific GUI (124). In the example of FIG. 1, the client-specific GUI (124) is a client-specific display of a debug session of the debuggee. The phrase 'client-specific' as used here describes a GUI and display of a debug session that may differ from other debug clients' GUI and display of the same debug session. A debug session is a semi-permanent interactive information interchange between at least one debug client and a debug server for the purposes of a debugging a particular debuggee. A session is set up or established at a certain point in time, and torn down at a later point in time. An established communication session may involve more than one message in each direction.

The client debug application (128) of the debug client (106) may also detect user input through the client-specific GUI, generate, in dependence upon the detected user (100) input, one or more application-level messages (126), and send the application-level messages to the debug server (102). The phrase 'application-lever' is used to describe messages that have meaning at a particular level in a data communications protocol model or framework. Consider, as one example of a data communications protocol model, the Open Systems Interconnection model that has seven layers, the application layer being the 'highest' and the physical layer being the lowest. Consider also, as another example, the TCP/IP model, which sets forth the application layer at the highest level and a link layer at the lowest level. The relative terms—higher and lower—describe a protocol's 'closeness' with regard to physical hardware (cables and the like) upon which data communications are passed. Each higher layer is a greater level of abstraction. In both models, the application layer or application-level is the highest level, farthest away from hardware and most abstracted layer. In the examples provided here, the application-level messages are abstracted from the data communications protocols used to transmit the data making up the application-level messages across one or many physical connections.

The term 'server' may, as context requires, refer to either or both of a server application or a computer upon which such a server application is executing. For clarity, the debug server (102) in the example of FIG. 1 is depicted and described as a computer upon which a server application executes. Stored in RAM (168) of the debug server (102) is a listening agent (129), a module of computer program instructions that listens on a port for debug client requests where that port is well-known to the client. The listening agent (129) may also provide debug clients with a list of available collaborative debug server applications (130) or begin execution of a particular collaborative debug server application (130) upon request. A debug client, for example, may request that a particular type of collaborative debug server application be started for debugging a particular debuggee. The server (102) in the example of FIG. 1, may support simultaneous execution of several different debug server applications, each of which may debug separate debuggees. The listening agent may also provide to a requesting debug client, a port, socket, or other data communications identifier of the collaborative debug server application with which the requesting debug client is to communicate with during a debug session. That is, the listening agent (129) effectively brokers communications between a collaborative debug server application (130) and a debug client (104).

Also stored in RAM (168) of the debug server (102) is a collaborative debug server application (130), a module of computer program instructions that, when executed by the computer processor (156) of the debug server, causes the debug server (102) to carry out server-side collaborative software debugging in accordance with embodiments of the present invention. The collaborative debug server application (130) also includes a debug administrator (114), a message router (116), a back-end debugger (118), and a debuggee (120).

The debug administrator (114) is a module of computer program instructions that administers a collaborative debug session, administering client identifiers, registering and unregistering clients in a debug session, and so on. A back-end debugger (118) is an application that controls operation of another application—the debuggee (120)—for the purpose of testing execution of the debuggee. The source code of the debuggee may run on an instruction set simulator (ISS), a technique that allows great power in its ability to halt when specific conditions are encountered but which will typically be somewhat slower than executing the code directly on a processor for which the code is written. When execution of a program crashes or reaches a preset condition, a debugger typically displays the position in the source code at which the execution of the program crashed. A 'crash' occurs when the program cannot normally continue because of a programming bug. In addition to displaying a position in source code when execution of the source code crashes, debuggers also often offer other functions such as running a program step by step (single-stepping or program animation), stopping, breaking, or pausing the program to examine the current state, at some event or specified instruction by means of a breakpoint, and tracking the values of some variables.

The term 'back-end' is used here to indicate that the debugger (118) in the example of FIG. 1 is indirectly controlled by multiple clients. As explained below in detail, the back-end debugger (118) is controlled indirectly by multiple clients through use of an intermediary—the message router (116). From the perspective of the back-end debugger (118), the debugger is controlled by a single source, the message router (116). The message router, however, operates as intermediary between multiple debug clients and the debugger. The term 'back-end' may be further described by contrast to the term 'front-end.' Debugger front-ends are popular extensions to debugger engines that provide Integrated Development Environment ('IDE') integration, program animation, and visualization features, rather than console-based command line interfaces. The 'front-end' directly faces a client, in contrast to the 'back-end' debugger (118) in the example of FIG. 1, which interfaces indirectly with the clients through the message router (116).

The collaborative debug server application (130) carries out server-side collaborative software debugging in accordance with embodiments of the present invention by: receiving, by the debug server (102) from the debug clients (104) asynchronously during a debug session of the debuggee (120), a plurality of application-level messages (126); routing, by the message router (116) in accordance with an application-level message passing protocol, the application-level messages (126) among the debug clients, the debug administrator, and the back-end debugger. In routing the messages in the example of FIG. 1, the message router (116) provides distributed control of the back-end debugger (118) to the debug clients (104) with the application-level messages (126) routed to the back-end debugger (118). The debug server application (138) also returns, to the debug clients (104) in response to the application-level messages routed to the back-end debugger, client-specific debug results. Each debug client (106, 108, 110, 112), is also configured to receive the client-specific debug results as application-level reply messages (126) and display, in the client-specific GUI (180), the client-specific debug results.

The debug server (102) and debug clients (104) are also configured for collaborative software with variable-specific messages. A variable-specific message as the term is used in this specification is a message that includes content to be displayed in association with a particular variable in a debug client's client-specific GUI upon evaluation of the particular variable. Content to be displayed "in association with" the particular variable refers to content that is displayed near or proximate to the GUI element representing the variable. A popup dialog anchored at the GUI element representing the variable, for example, may include content displayed "in association with" the variable.

In the example system of FIG. 1, one of the debug clients—say, debug client (106)—may operate as a requesting debug client by detecting user input establishing a variable-specific message for a particular variable, generate a request (127) to establish the variable-specific message for the particular variable, and send the request (127) to establish the variable-specific message for the particular variable to the debug server (102).

The debug server (102) may receive the request (127) to establish a variable-specific message for a particular variable and establish, through use of the message router, the variable-specific message for the particular variable. Establishing, by the message router (116), the variable-specific message may be carried out by retrieving, from the back-end debugger (118), an address of the particular variable and storing, as a record representing the variable-specific message for the particular variable, an association of the address of the particular variable and the content to be displayed in association with the particular variable. That is, the message router may maintain a table of records, each record representing a variable specific message, and each including an address of the variable and the content to be displayed in association with the variable. In some embodiments, the record may also include an identifier of the debug client for which the message was established.

After the message is established, one of the other debug clients (108, 110, 112) may act as a variable evaluating debug client, sending to the debug server (102) a request to evaluate the particular variable. Prior to passing the variable to the back-end debugger for evaluation, the message router determines whether a variable-specific message has been established for the particular variable. The message router may make such a determination by retrieving an address of the variable from the back-end debugger (118), and searching the table of variable-specific message for a message associated with the retrieved address. If the table includes a record associated with the retrieved address, a variable-specific message for the particular variable has been established. The message router may returns, to the variable evaluating debug client, the content of the variable-specific message to be displayed in association with the variable in the variable evaluating debug client's client-specific GUI along with the evaluation of the variable. That is, the message router (116) to utilize the back-end debugger to evaluate the variable and provides the results of the evaluation along with the content of the variable-specific message to the debug client requesting the evaluation of the variable. The variable evaluating debug client then receives the content of the variable-specific message along with the evaluation of the particular variable and displays, in the debug client's client specific GUI and in association with the particular variable, the content of the variable-specific message along with the evaluation of the particular variable.

Also stored RAM (168) of the debug server (102) and debug clients (104) is an operating system (154). An operating system is a computer software component that is responsible for execution of application programs and for administration of access to computer resources, memory, processor time, and I/O functions, on behalf of application programs. Operating systems useful in computers of a distributed system in which collaborative software debugging is carried out according to embodiments of the present invention include UNIX™, Linux™, Microsoft XP™, AIX™, IBM's i5/OS™, and others as will occur to those of skill in the art. The operating system (154), collaborative debug server application (130), debuggee (120), client debug application (128), client-specific debug GUI (124), and so on in the example of FIG. 1 are shown in RAM (168), but many components of such software typically are stored in non-volatile memory also, such as, for example, on a disk drive (170).

Each of the debug server (102) and debug clients (104) of FIG. 1 includes disk drive adapter (172) coupled through expansion bus (160) and bus adapter (158) to processor (156) and other components of the debug server (102) and debug clients (104). Disk drive adapter (172) connects non-volatile data storage to each of the debug server (102) and debug clients (104) in the form of disk drive (170). Disk drive adapters useful in computers that provide collaborative software debugging according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Each of the example debug server (102) and debug clients (104) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. Each of the example debug server (102) and debug clients (104) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

Each of the example debug server (102) and debug clients (104) of FIG. 1 includes a communications adapter (167) for data communications with other computers and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that provide collaborative software debugging according to embodiments of the present invention include modems for wired dial-up communications, Ethernet (IEEE 802.3) adapters for wired data communications network communications, and 802.11 adapters for wireless data communications network communications.

The arrangement of debug servers, debug clients, data communications networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
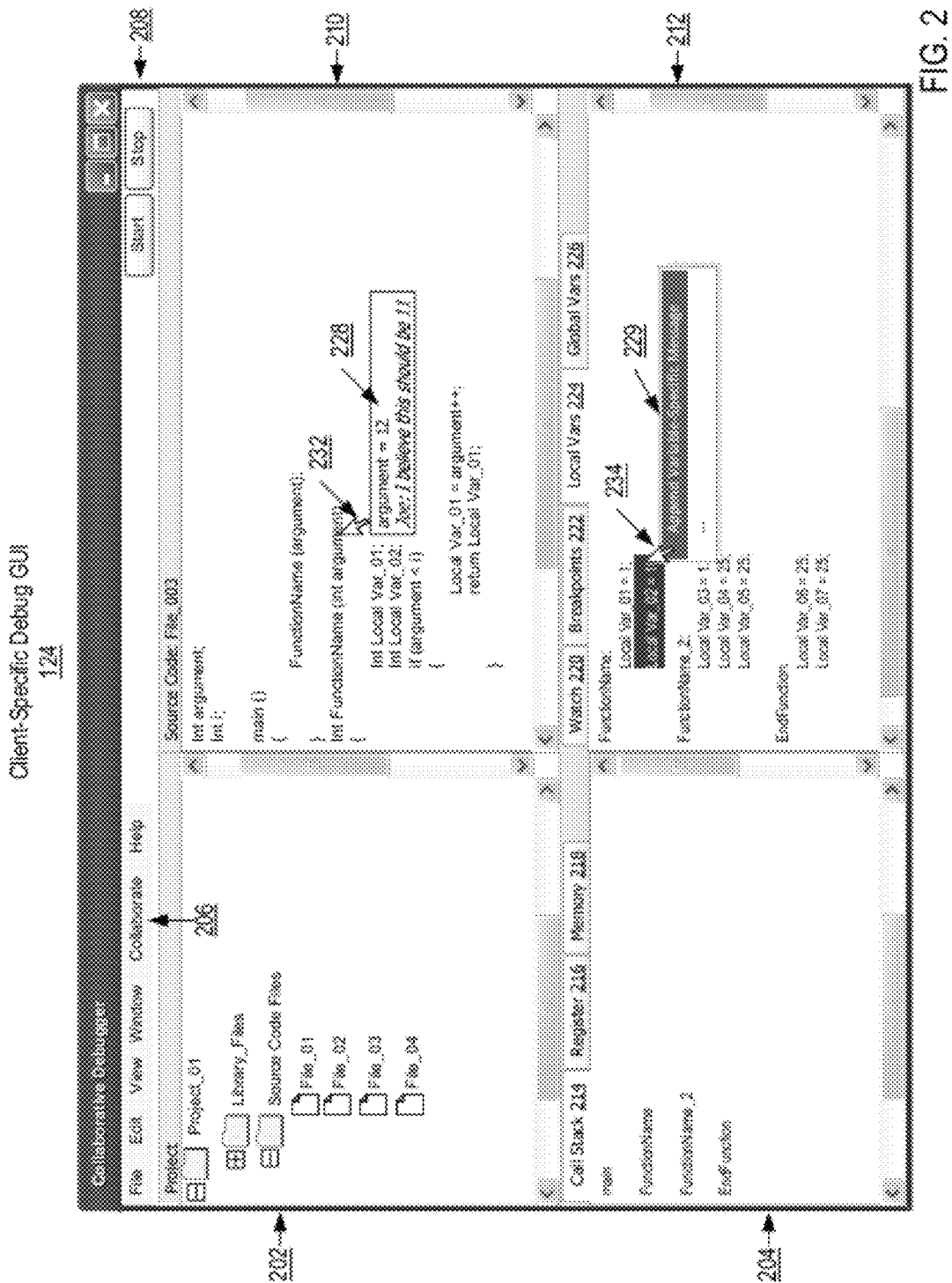
FIG. 2 sets forth an example client-specific graphical user interface ('GUI') presented to a user of a debug client in accordance with embodiments of the present invention.

For further explanation, FIG. 2 sets forth an example client-specific GIU presented to a user of a debug client in accordance with embodiments of the present invention. The example GUI (124) of FIG. 2 provides an interface for a user of a debug client to effectively control, collaboratively with other client debuggers, the back-end debugger of a debug server. The debug GUI of each debug client in a distributed system for which collaborative software debugging is carried out in accordance with embodiments of the present invention is client-specific, meaning any one debug GUI may be configured differently, displayed differently, or operate differently, than any other debug client's GUI, while all debug clients collaboratively control the same, single back-end debugger of a debug server during the same debug session of the same debuggee. One debug GUI may display the source code at one location (line number) while another debug GUI displays the source code at another location; one debug GUI displays a call stack of one thread, while another debug GUI displays a call stack of another thread; one debug GUI displays evaluation results of one variable, while another debug GUI displays evaluation results of another variable; and so on as will occur to readers of skill in the art. The example client-specific debug GUI (124) of FIG. 2 provides a client-specific display of debugging along with collaborative, or 'distributed,' control of the debugger, rather than all debug clients displaying only the same GUI as a single master debug client, where the master client has absolute, not collaborative, control over the debugger until passing that control to another client.

The example GUI (124) of FIG. 2 includes a menu bar (208), including a number of separate menus: a File menu, an Edit menu, a View menu, a Collaborate menu, and a Help menu. The Collaborate menu (206), when selected, may provide a user with various menu items that support collaborative debugging. The example GUI (124) of FIG. 2 also includes several independent portions—called panes (as in 'window panes') for clarity of explanation—a project pane (202), a source code pane (210), and two separate data panes (204, 212). Project pane (202) presents the files and resources available in a particular software development project. Source code pane (210) presents the source code of debuggee. The data panes (204, 212) present various data useful in debugging the source code. In the example of FIG. 2, data pane (204) includes three tabs, each of which presents different data: a call stack tab (214), a register tab (214), and a memory tab (218). Data pane (212) includes four tabs: a watch list tab (220), a breakpoints (222) tab, a local variable tab (224), and a global variable tab (226).

The example GUI (124) of FIG. 2 depicts two separate mouse pointers for ease of explanation of two separate examples, but readers of skill in the art will recognize that in most implementations, only one mouse pointer will be present. One mouse pointer (232) in the example GUI (124) of FIG. 2 has been directed, by user input, to hover over the variable 'argument,' where hovering invokes an evaluation of the variable. That is, the debug client presenting the example GUI (124) of FIG. 2 is configured to generate and send to a debug server a request to evaluate a variable upon a mouse pointer hovering a predetermined amount of time over the variable. In this example, the debug client presenting the example GUI (124) of FIG. 2 generates and sends to the debug server a request to evaluate the variable 'argument.' Prior to sending the request to evaluate 'argument,' another debug client identified as 'Joe' established a variable-specific message for 'argument.' As such, the debug server, responsive to the request to evaluate 'argument' returned to the debug client presenting the example GUI (124) of FIG. 2, the content of the variable-specific message for 'argument' to be displayed in association with 'argument.' Here, the debug client presenting the example GUI of FIG. 2 displays the content of the variable-specific message in a pop-up dialog box (228) along with the evaluation of the variable and an identifier of the debug client that established the variable-specific message. In the example of FIG. 2, the content states "I believe this should be 11," the evaluation is a value of 12, and the debug client that established the variable-specific message is identified as "Joe."

The second mouse pointer (234) is positioned near a local variable—Var_02—in the local variables tab (224). The user has selected 'Var_02' and a pop-up selection list (229) is displayed. In the list is an option for the user to append a variable-specific message to 'Var_02.' Upon selection of this option, the user of the debug client presenting example GUI (124) of FIG. 2 may input content for the variable specific message. Then, the debug client presenting the example GUI (124) of FIG. 2 will generate and send to the debug server a request to establish a variable-specific message for 'Var_02.' The debug client may also present, through the GUI (124) to the user, other options regarding the variable-specific including, for example, options for automatic cancellation of the variable-specific message. For example, the user may specify that the variable-specific message be cancelled upon a change in value of the particular variable, upon resumption of debuggee execution, upon a next stop in execution after execution of the debuggee is resumed, or upon a stop in execution of the debuggee in a call stack location other than the present call stack location.

The GUI items, menus, window panes, tabs, and so on depicted in the example client-specific GUI (124) of FIG. 2, are for explanation, not for limitation. Other GUI items, menu bar menus, drop-down menus, list-boxes, window panes, tabs, and so on as will occur to readers of skill in the art may be included in client-specific GUIs presented by debug clients in a distributed system in which collaborative software debugging is carried out in accordance with embodiments of the present invention.

Figure 3:
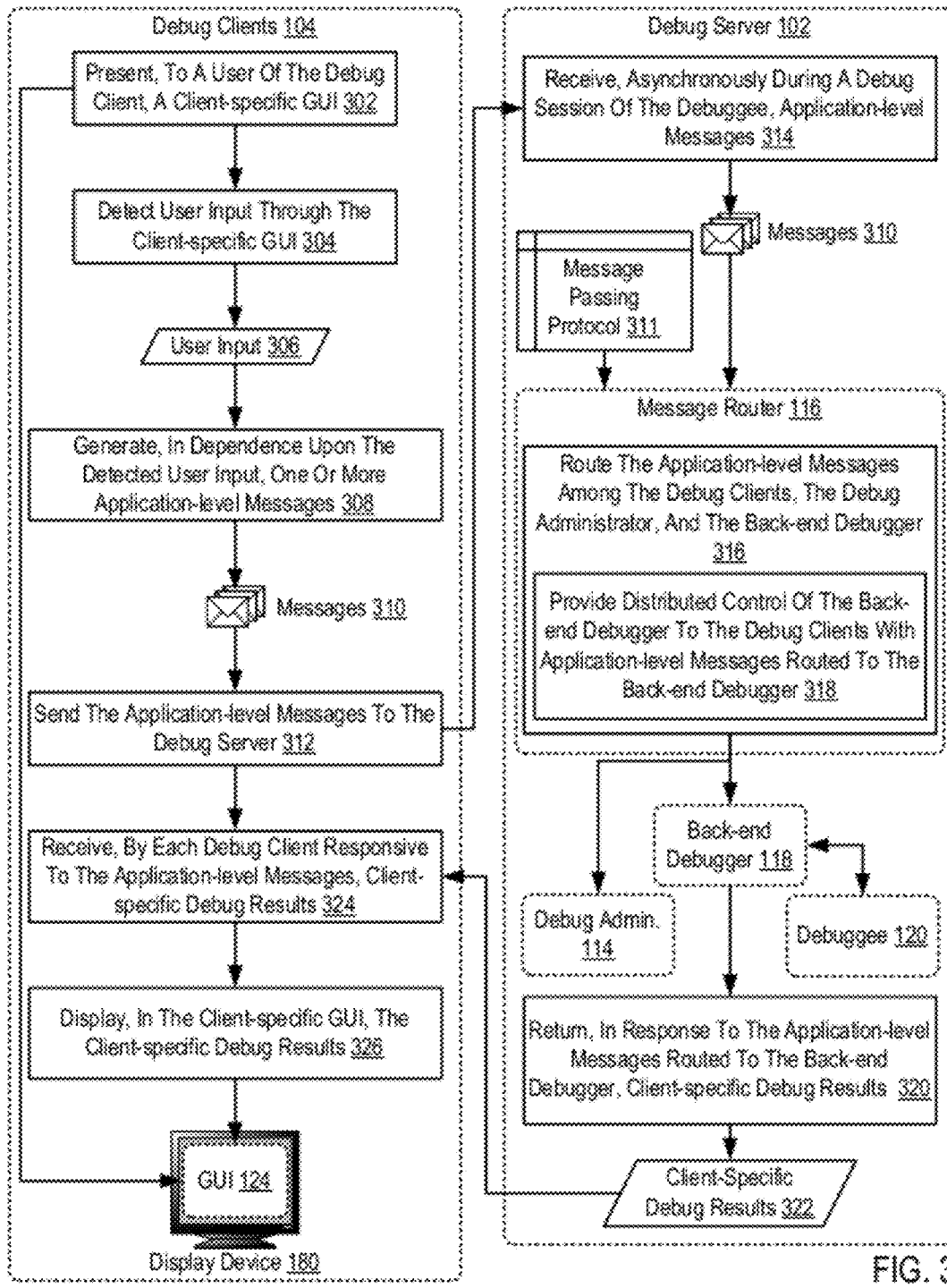
FIG. 3 sets forth a flowchart illustrating an exemplary method of collaborative software debugging in a distributed system in accordance with embodiments of the present invention.

For further explanation, FIG. 3 sets forth a flowchart illustrating an exemplary method of collaborative software debugging in a distributed system in accordance with embodiments of the present invention. In the method of FIG. 3, the distributed system includes a debug server (102), a plurality of debug clients (104), and a data communications network (100 on FIG. 1). The debug server (102) is coupled for data communications to the plurality of debug clients (104) through the data communications network (100). The debug server (102) further includes a debug administrator (114), a message router (116), a back-end debugger (118), and a debuggee (120).

The method of FIG. 3 includes presenting (302), by each debug client (104) to a user (101 on FIG. 1) of the debug client (104), a client-specific GUI (124). In the method of FIG. 3, each debug client's (104) client-specific GUI (124) is implemented as a client-specific display of a debug session of the debuggee (120). Presenting (302) a client-specific GUI (124) may be carried out by rendering the GUI (124) on a display device (180), with each debug client operating semi-independently from other debug clients in presenting the GUI (124). As mentioned above, each GUI (124) may be display different debugging attributes even though each of the debug clients presenting the GUI (124) are participating in the same debug session of the same debuggee.

The method of FIG. 3 also includes detecting (304), by each debug client (104), user (101 on FIG. 1) input (306) through the client-specific GUI (124). Detecting (304), user input (306) through the client-specific GUI (124) may be carried out in various ways including, for example, detecting mouse-overs, detecting keyboard keystrokes, detecting keyboard shortcuts, detecting explicit commands entered into a field presented to receive such commands, detecting selection of drop-down menu items, detecting mouse-clicks on GUI items, such as GUI buttons, and so on.

The method of FIG. 3 also includes generating (308), by each debug client (104) in dependence upon the detected user input (306), one or more application-level messages (310) and sending (312), by each debug client (104), the application-level messages (310) to the debug server (102). Generating (308) one or more application-level messages (310) may be carried out by identifying, from message generation rules, a message type, and creating application-level messages of the message type that includes at least an identification of a sender, a recipient, and the message type. Examples of message types are described below in detail and include a JOIN message type, a LEAVE message type, a DISTRIBUTE REQEUST message type, a COMMAND REQUEST message type, and EVENT REQUEST message type, a REGISTER GROUP message type, a CONFIRMATION REPLY message type, a REQUEST REPLY message type, and an EVENT REPLY message type.

The method of FIG. 3 also includes receiving (314), by the debug server (102) from the debug clients (104) asynchronously during a debug session of the debuggee (120), the application-level messages (310). Receiving (314) the application-level messages (310) may be carried out by listening on a well-known data communications socket, upon which application-level messages (310) of the kind sent by the debug clients (104) are expected to be received.

The method of FIG. 3 also includes routing (316), by the message router (116) in accordance with an application-level message passing protocol (311), the application-level messages (310) among the debug clients (104), the debug administrator (114), and the back-end debugger (118). In the method of FIG. 3, routing (316) the application-level messages (310) includes providing (318) distributed control of the back-end debugger (118) to the debug clients (104) with application-level messages (310) routed to the back-end debugger (118). That is, the messages routed to the back-end debugger—message received from any of the debug clients at any time during the debug session of the debuggee—control operation of the back-end debugger. The application-level messages control debugging of the debugging.

The method of FIG. 3 also includes returning (320), by the debug server (102) to the debug clients (104) in response to the application-level messages (310) routed to the back-end debugger (118), client-specific debug results (322). Returning (320), client-specific debug results (322) to the debug clients (104) may be carried out by generating, by the debug server or more specifically, the message router (116), one or more application-level messages forming a reply or replies that include the results and sending the replies to the debug clients via the data communications network (100 on FIG. 1).

The method of FIG. 3 also includes receiving (324), by each debug client (104) responsive to the application-level messages (310), client-specific debug results (322) and displaying (326), by each debug client in the client-specific GUI (124) on a display device (180), the client-specific debug results (322).

Figure 4:
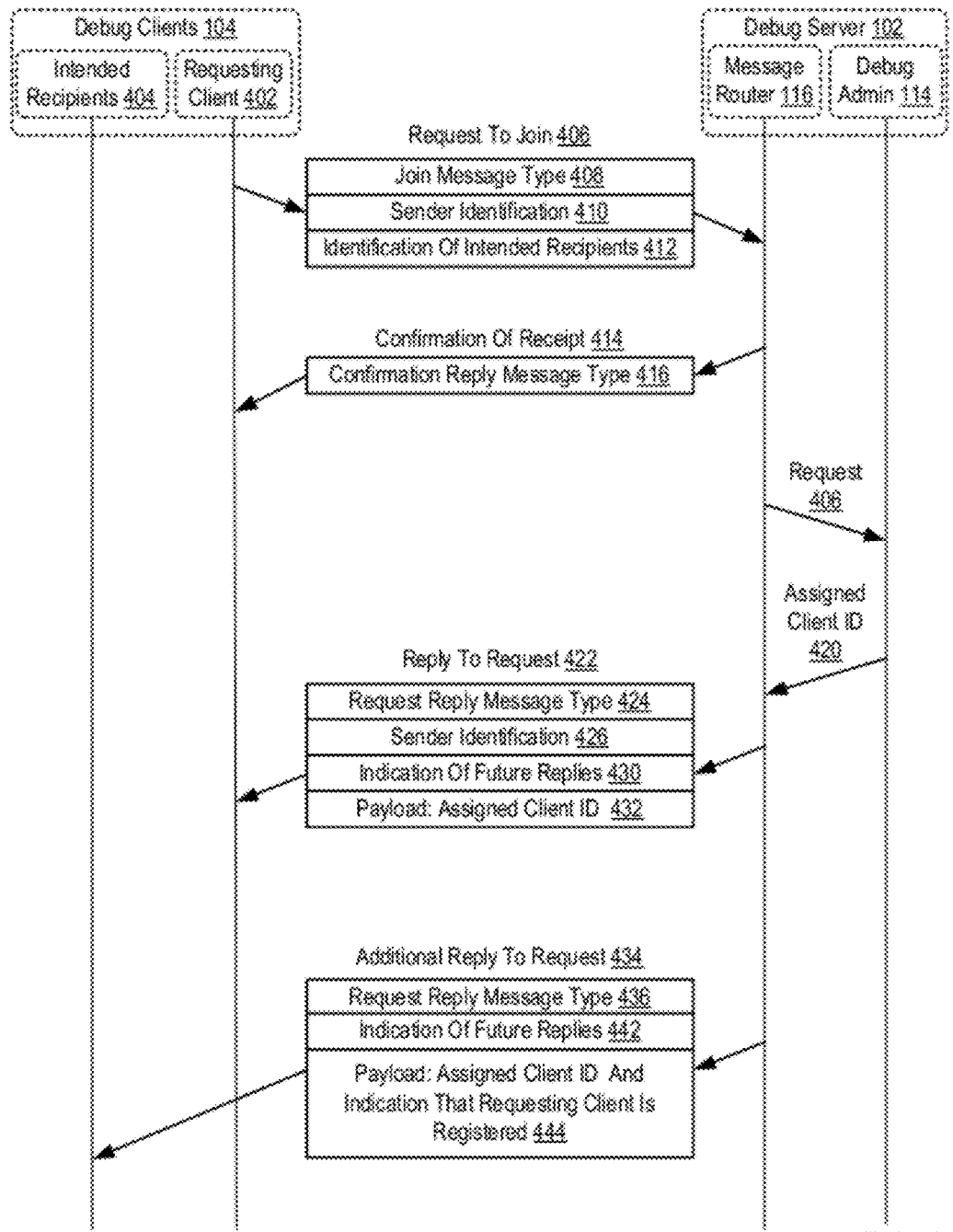
FIG. 4 sets forth a sequence diagram illustrating a further exemplary method of collaborative software debugging in accordance with embodiments of the present invention in which a debug client requests to join a debug session.

As described above, once received by a debug server (102) from a debug client, an application-level message (310) in the example of FIG. 3, the application-level message (310) is routed to one of a back-end debugger (118), a debug administrator (114), or one or more other debug clients (104) in dependence upon an application-level message passing protocol (311). For further explanation of such a message passing protocol useful in distributed systems in which collaborative software debugging is carried out in accordance with embodiments of the present invention, FIGS. 4-9 set forth various sequence diagrams that illustrate message passing in accordance with the message passing protocol. FIG. 4, therefore, sets forth a sequence diagram illustrating a further exemplary method of collaborative software debugging in accordance with embodiments of the present invention in which a debug client requests to join a debug session. The method of FIG. 4 is carried out in a distributed system similar to the system of FIG. 1 which includes a debug server (102), a plurality of debug clients (104), and a data communications network (100 on FIG. 1). The debug server (102) is coupled for data communications to the plurality of debug clients (104) through the data communications network (100). The debug server (102) further includes a debug administrator (114), a message router (116), a back-end debugger (118 on FIG. 1), and a debuggee (120 on FIG. 1).

The method of FIG. 4, illustrated in a sequence diagram rather than a flowchart, is similar to the method of FIG. 3 in that the method of FIG. 4 depicts a debug client—the requesting client (402) of FIG. 4—generating (308 on FIG. 3) one or more application-level messages (310 on FIG. 3). In the example of FIG. 4, the requesting client (402) generates a request (406) to join the debug session. In the method of FIG. 4, the request is implemented as an application-level message having a JOIN REQUEST message type (408), an identification (410) of the sender of the request to join (such as an IP address, Socket Number, or port number), and an identification (412) of one or more intended recipients. Such intended recipients may include the sender, all other debug clients registered in the session, or some subset of debug clients registered in the session. As explained below in more detail, an identification of an intended recipient in the example request (406) to join is not an identification of a recipient of the request itself—the debug server (102) is the recipient of the request itself—instead, the identification of an intended recipient in the request join actually identifies a recipient of future replies to the request. The request (406) may also include a message identifier, uniquely identifying the request. Responses to the request may include such a message identifier so that debug clients may identify the request to which the response relates.

In the example of FIG. 4, sending (312 on FIG. 3), by the requesting client (402), the application-level messages (310 on FIG. 3) to the debug server (102), includes sending the request (406) to join the debug session and receiving (314 on FIG. 3) the application-level messages (310 on FIG. 3) includes receiving, by the debug server (102) and, more specifically, the message router (116), the request (406) to join the debug session.

The method of FIG. 4 also includes sending, by the message router to the requesting debug client (402), in response to receiving the request (406), a confirmation (414) of receipt of the request (406) to join, the confirmation implemented as an application-level message having a CONFIRMATION REPLY message type (416). The confirmation may also include a message identifier that uniquely identifies the request (406) for which the confirmation reply is confirming receipt. The requesting debug client (402) in the example of FIG. 4 receives the confirmation (414). If the requesting debug client (402) does not receive a confirmation (414) after a predefined amount of time, the requesting client (402) may resend the request (406).

After receiving the request (406), the message router (116) routes (316 on FIG. 3) the application-level messages by forwarding the request (406) to join the debug session to the debug administrator (114). The debug administrator (114) then registers the requesting debug client (402) in the debug session and assigns the requesting debug client (402) a client identifier (420) unique to the debug session. After assignment a client identifier may be used in message passing among the debug clients, debug server, and debug administrator to identify a recipient of a message, to identify a sender of a message, and so on. The debug administrator (114) may maintain a list, or other data structure, of available client identifiers and a table, or other data structure, of assigned client identifier. A table of assigned client identifiers may include a plurality of entries, with each entry representing a single client. Each entry in such a table may associate a client identifier with another identification of the client—a MAC (Media Access Control) address, an IP (Internet Protocol) address, a socket identifier, and so on as will occur to readers of skill in the art.

After assigning the client identifier (420), the debug administrator (114) may return, to the message router (116), the assigned client identifier (420) and the message router (116) may send the client identifier (420) along to the requesting client (402) in a reply (422) to the request (406) to join the debug session. In the example of FIG. 4, the reply (422) is implemented as an application-level message having a REQUEST REPLY message type (424), an indication (430) of future replies responsive to the request (406) to join, an identification (426) of sender of the reply, and a payload (432) that includes the assigned client identifier (420). In the method of FIG. 4, the requesting client (402) receives the reply (422).

In the method of FIG. 4, the message router (116) also sends, to debug clients (404) identified as intended recipients in the request (406) to join, an additional reply (434) to the request (406) to join and the debug clients (404) receive the additional reply (434). In the method of FIG. 4, the additional reply (434) is implemented as an application-level message having a REQUEST REPLY message type (436), an indication (442) of future replies responsive to the request to join, and a payload (444) that includes the assigned client identifier (420) and an indication that the requesting debug client is registered in the debug session.

Figure 5:
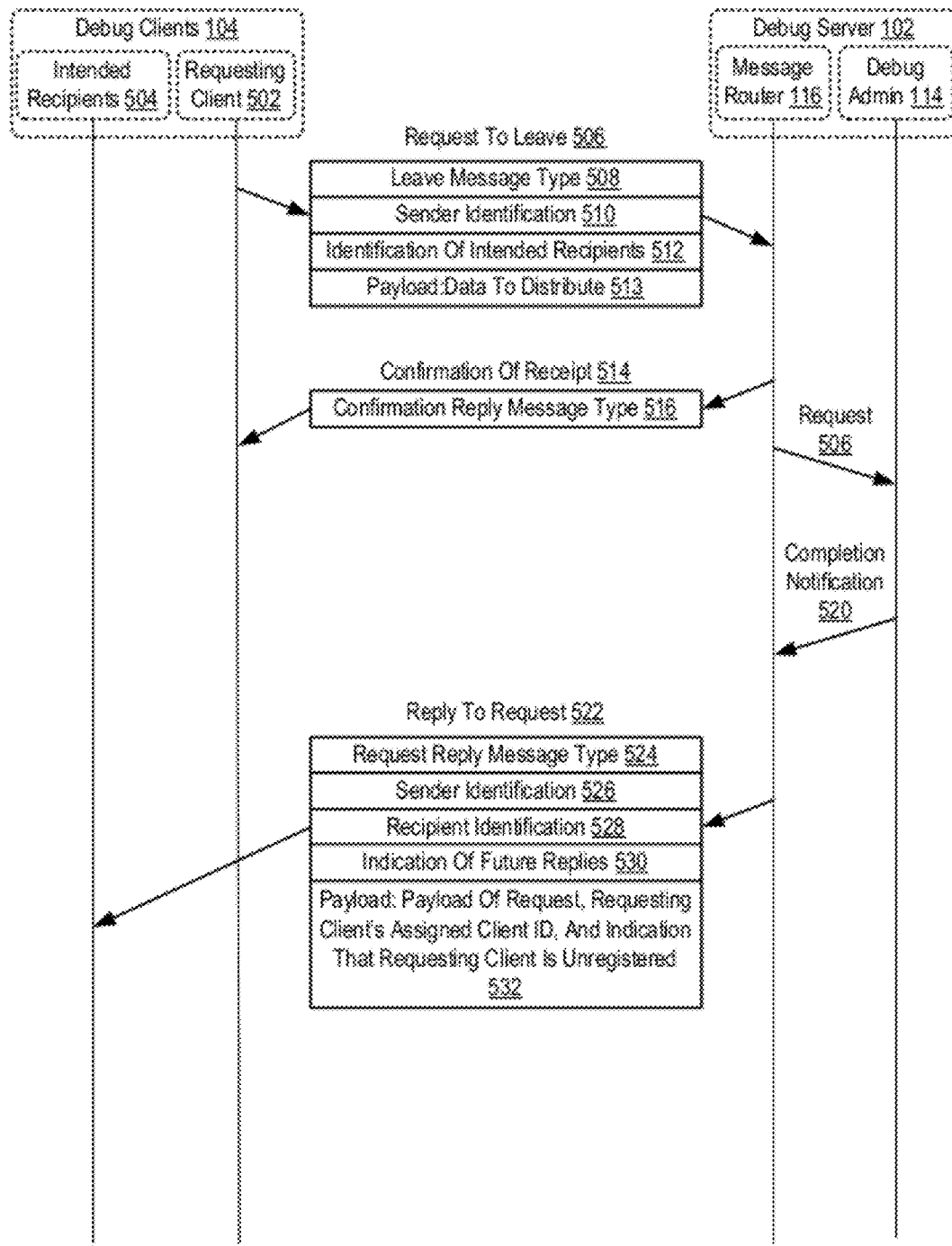
FIG. 5 sets forth a sequence diagram illustrating a further exemplary method of collaborative software debugging in accordance with embodiments of the present invention in which a debug client requests to leave a debug session.

For further explanation, FIG. 5 sets forth a sequence diagram illustrating a further exemplary method of collaborative software debugging in accordance with embodiments of the present invention in which a debug client requests to leave a debug session. The method of FIG. 5 is carried out in a distributed system similar to the system of FIG. 1 which includes a debug server (102), a plurality of debug clients (104), and a data communications network (100 on FIG. 1). The debug server (102) is coupled for data communications to the plurality of debug clients (104) through the data communications network (100). The debug server (102) further includes a debug administrator (114), a message router (116), a back-end debugger (118 on FIG. 1), and a debuggee (120 on FIG. 1).

The method of FIG. 5 includes generating, by a requesting debug client (502), a request (506) to leave the debug session and receiving the request (502) to leave the debug session by the message router (116). In the example of FIG. 5, the request (506) is implemented as an application-level message having a LEAVE REQUEST message type (508), a sender's identification (510), an identification (512) of one or more intended recipients, and a payload (513) to distribute to the intended recipients upon leaving the debug session.

The method of FIG. 5 continues by the message router (116) sending, to the requesting debug client (502), a confirmation of receipt of the request (506) to leave and receiving by the requesting debug client (502) the confirmation. The confirmation in the example of FIG. 5 may be implemented as an application-level message having a CONFIRMATION REPLY message type (516).

The method of FIG. 5 also includes by forwarding the request (506) to leave the debug session to the debug administrator, unregistering, by the debug administrator (114), the requesting debug client from the debug session, including unassigning the requesting debug client's (502) client identifier, and returning, to the message router (116) a completion notification (520).

The message router (116) in the example of FIG. 5 then sends, to debug clients (504) identified as intended recipients in the request (502) to leave, a reply (522) to the request to leave and receiving, by the debug clients (504) identified as intended recipients, the reply (522) to the request to leave. The reply (522) may be implemented as an application-level message having a REQUEST REPLY message type (524), an identification (526) of a sender of the message, an identification of the recipient of the message (528), an indication (530) of future replies responsive to the request (506) to leave, and as a payload (542) of the reply, the payload (513) included in the request (513) to leave.

Figure 6:
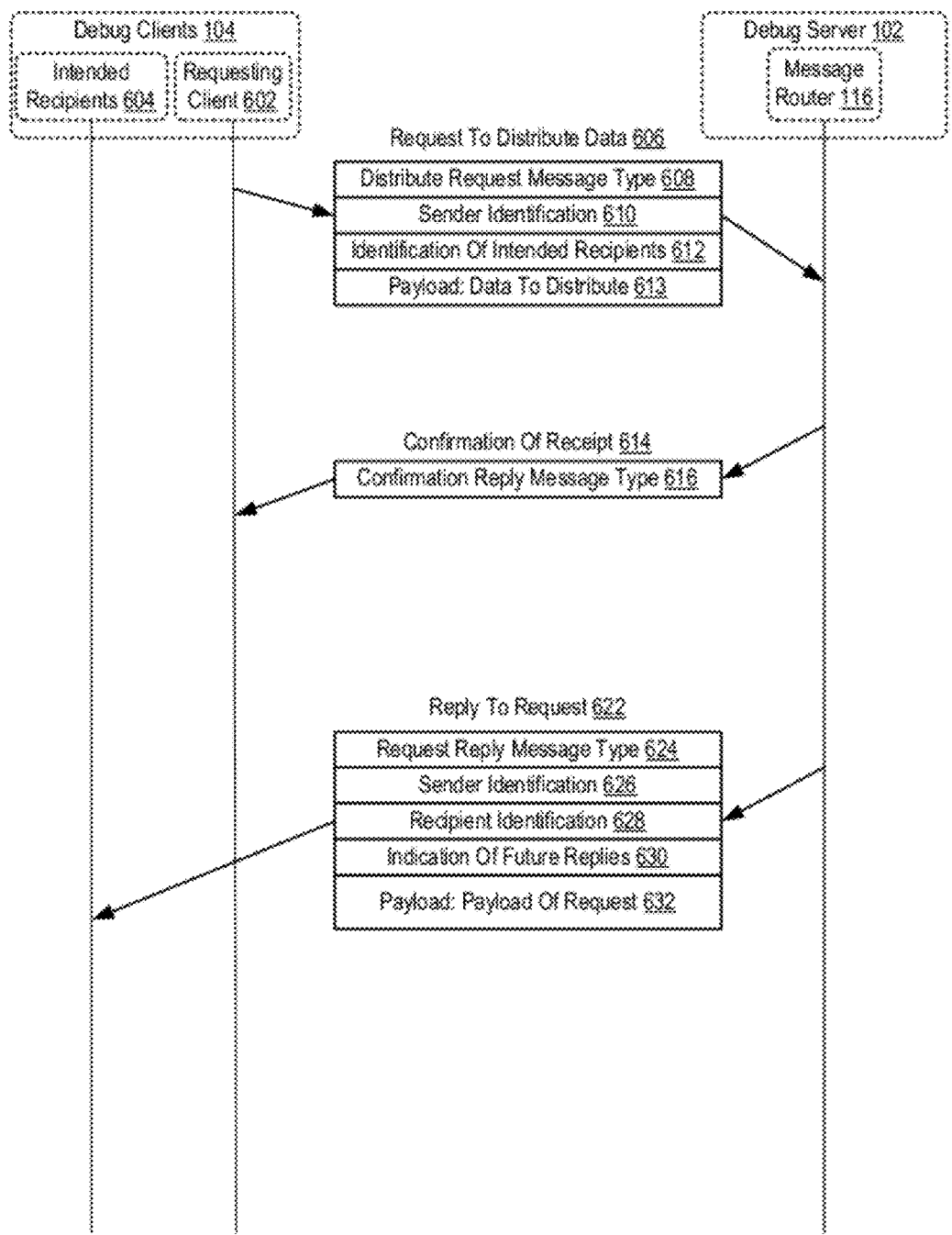
FIG. 6 sets forth a sequence diagram illustrating a further exemplary method of collaborative software debugging in accordance with embodiments of the present invention in which a debug client requests to distribute data to other debug clients.

For further explanation, FIG. 6 sets forth a sequence diagram illustrating a further exemplary method of collaborative software debugging in accordance with embodiments of the present invention in which a debug client requests to distribute data to other debug clients. The method of FIG. 6 is carried out in a distributed system similar to the system of FIG. 1 which includes a debug server (102), a plurality of debug clients (104), and a data communications network (100 on FIG. 1). The debug server (102) is coupled for data communications to the plurality of debug clients (104) through the data communications network (100). The debug server (102) further includes a debug administrator (114), a message router (116), a back-end debugger (118 on FIG. 1), and a debuggee (120 on FIG. 1).

The method of FIG. 6 includes generating, by a requesting debug client (602), a request (606) to distribute data (613) to debug clients registered in the debug session, sending, to the debug server, the request (606), and receiving, by the message router (116), the request (606). In the example of FIG. 6, the request (606) to distribute data may be implemented as an application-level message having a DISTRIBUTE REQUEST message type (608), an identification of a sender (610) of the message, an identification (612) of one or more intended recipients (604), and a payload that includes data (613) to distribute to the intended recipients.

Responsive to receiving the request (606), the message router (116) in the example of FIG. 6, sends, to the requesting debug client (602), a confirmation of receipt of the request (606) to distribute data and the requesting debug client (602) receives the confirmation (614). In the example of FIG. 6, the confirmation may be implemented as an application-level message having a CONFIRMATION REPLY message type (616).

The method of FIG. 6 continues by sending, by the message router (116) to debug clients identified as intended recipients (602) in the request (606) to distribute data, a reply (622) to the request (606) to distribute data, and receiving, by the debug clients identified as intended recipients (602), the reply (622). In the example of FIG. 6, the reply (622) may be implemented as an application-level message having a REQUEST REPLY message type (624), an identification of a sender of the message (626), an identification (628) of a recipient of each message, an indication (630) of future replies responsive to the request (606) to distribute data, and a payload (632).

The payload (632) of the reply (622) includes the data to distribute originally included in the request (606). That is, the payload (632) of the reply (622) is the payload (613) included in the request (606) to distribute data.

Figure 7:
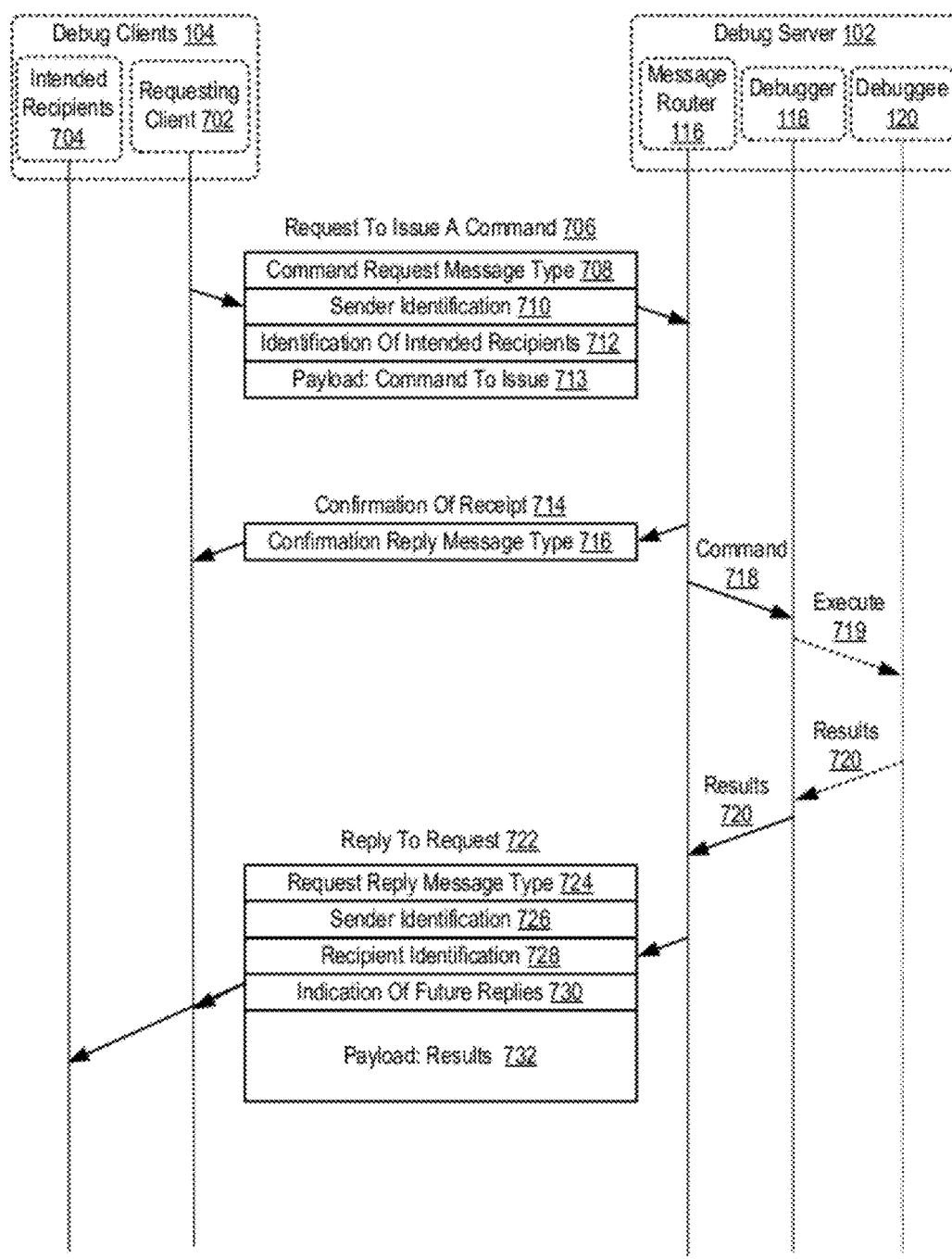
FIG. 7 sets forth a sequence diagram illustrating a further exemplary method of collaborative software debugging in accordance with embodiments of the present invention in which a debug client requests to issue a command to the back-end debugger.

FIG. 7 sets forth a sequence diagram illustrating a further exemplary method of collaborative software debugging in accordance with embodiments of the present invention in which a debug client requests to issue a command to the back-end debugger. The method of FIG. 7 is carried out in a distributed system similar to the system of FIG. 1 which includes a debug server (102), a plurality of debug clients (104), and a data communications network (100 on FIG. 1). The debug server (102) is coupled for data communications to the plurality of debug clients (104) through the data communications network (100). The debug server (102) further includes a debug administrator (114), a message router (116), a back-end debugger (118 on FIG. 1), and a debuggee (120 on FIG. 1).

The method of FIG. 7 includes generating, by a requesting debug client (702), a request (706) to issue a command (718) to the back-end debugger (118), sending the request (706) to the debug server (102), and receiving the request (722) by the message router (116). In the example of FIG. 7, the request (706) may be implemented as an application-level message having a COMMAND REQUEST message type (708), an identification (710) of a sender of the message, an identification (712) of one or more intended recipients of results of executing the command, and a payload (713). The payload (713) of the request (706) in the example of FIG. 7 includes the command to issue to the back-end debugger. The command may be a text command to be entered into a command line interface of the back-end debugger. Examples of commands which may be issued to a back—end debugger through a command line interface, may include: backtrace, step, next, until, continue, clear, help, info breakpoints, info watchpoints, info registers, info threads, and so on as will occur to readers of skill in the art. These are merely some of many possible commands which may be issued to a debugger.

The method of FIG. 7 continues by sending, by the message router (116) to the requesting debug client (702), a confirmation (714) of receipt of the request (706) to issue the command (718) and receiving the confirmation by the requesting debug client (702). In the example of FIG. 7, the confirmation (714) is implemented as an application-level message having a CONFIRMATION REPLY message type (716).

The method of FIG. 7 also includes routing the request (706) to the back-end debugger (118) by issuing the command (718) to the back-end debugger (118) by the message router (116). The method of FIG. 7 continues by the back-end debugger, executing the issued command (718). For some commands, executing the command (718) causes the back-end debugger (118) to initiate execution (719) of the debuggee, for debugging purposes, monitor the execution of the debuggee, and gather results (720) of the execution. For other commands, the command may be executed entirely by the back-end debugger without initiating execution of the debuggee.

After executing the issued command in the example of FIG. 7, the back-end debugger (118) returns to the message router (116) results (720) of the execution of the issued command, the message router receives the results (718). The nature of the results (720) of the execution depend upon the type of command (718) executed by the back-end debugger. A command to evaluate a variable for example, may return as little as an integer, while a command to step into execution of the debuggee may return significantly more information— variable values, register values, memory values, line number, source code file name, and thread number and so on. The results (720), once received by the requesting client (702) may be used to control the client-specific GUI, changing the information displayed on the GUI.

The message router (116) in the example of FIG. 7 sends, to each of the requesting debug client (702) and debug clients (704) identified as intended recipients in the request (706) to issue the command (718), a reply (722) to the request to issue the command and the debug clients (704) and requesting client (702) receive the reply (722). In the example of FIG. 7, the reply (722) may be implemented as an application-level message having a REQUEST REPLY message type (724), an identification (726) of a sender of the message, an identification (728) of a recipient of the message, an indication (730) of future replies responsive to the request (706) to issue the command, and a payload (732) that includes the results (720) of executing the issued command.

Figure 8:
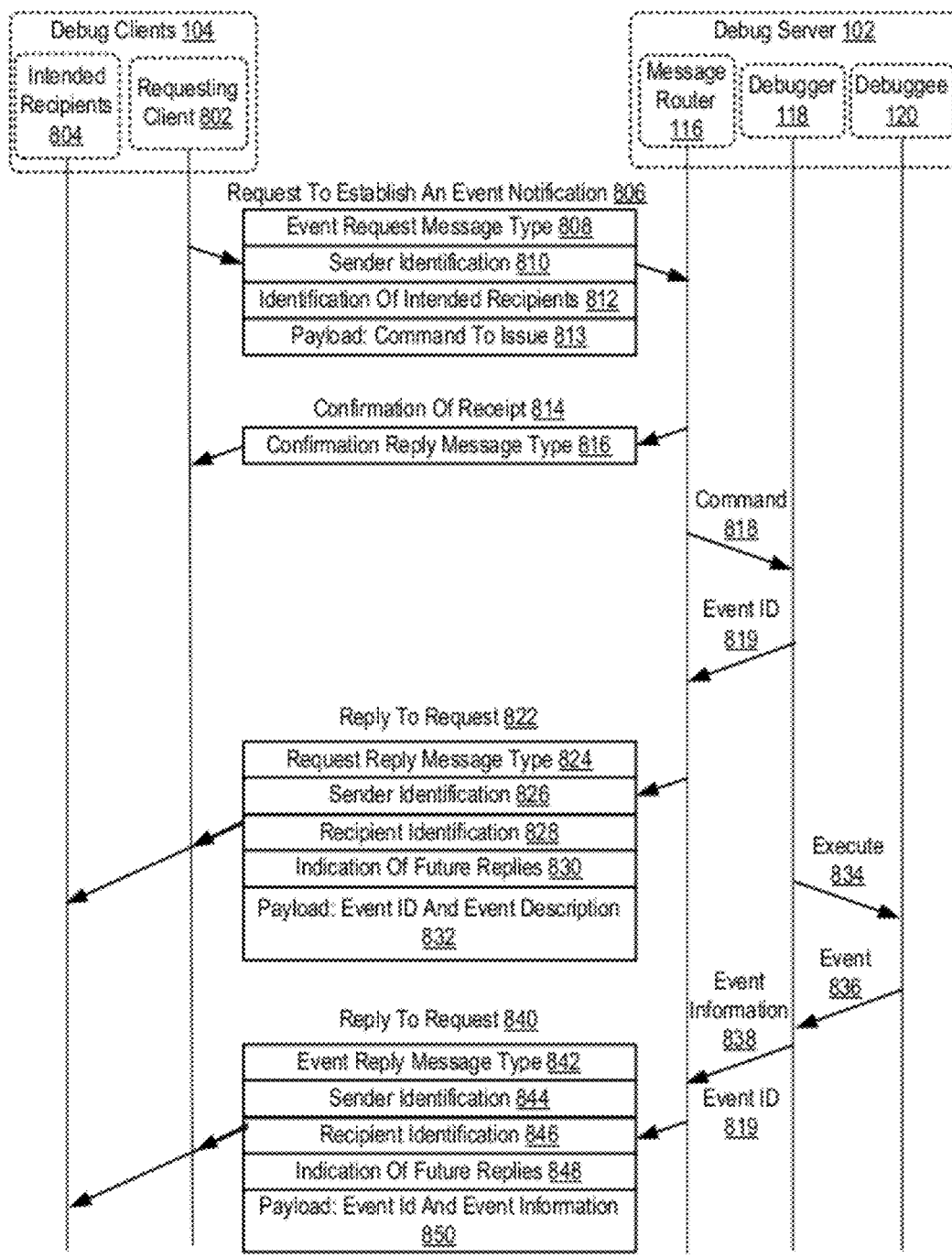
FIG. 8 sets forth a sequence diagram illustrating a further exemplary method of collaborative software debugging in accordance with embodiments of the present invention in which a debug client requests to establish an event notification with the back-end debugger.

FIG. 8 sets forth a sequence diagram illustrating a further exemplary method of collaborative software debugging in accordance with embodiments of the present invention in which a debug client requests to establish an event notification with the back-end debugger. The method of FIG. 8 is carried out in a distributed system similar to the system of FIG. 1 which includes a debug server (102), a plurality of debug clients (104), and a data communications network (100 on FIG. 1). The debug server (102) is coupled for data communications to the plurality of debug clients (104) through the data communications network (100). The debug server (102) further includes a debug administrator (114), a message router (116), a back-end debugger (118 on FIG. 1), and a debuggee (120 on FIG. 1).

The method of FIG. 8 includes generating, by a requesting debug client (802), a request (806) to establish, with the back-end debugger, an event notification associated with a particular event during the debug session, sending, to the debug server (102), the request (806), and receiving, by the message router, the request (806). In the example of FIG. 8, the request (806) may be implemented as an application-level message having an EVENT REQUEST message type (806), an identification (810) of a sender of the message, an identification (812) of one or more intended recipients of notifications of the of the event, and a payload (813) that includes a command (818) to issue to the back-end debugger (118) to establish the event notification. An event is a predefined occurrence during execution of debuggee. Such an event may include encountering a breakpoint, a watchpoint, a catchpoint, or the like. A breakpoint is a specification of a source code location at which a debuggee will pause or stop execution. A watchpoint is a breakpoint configured to pause or stop execution of the debuggee when a value of a particular expression changes. A catchpoint is another type of breakpoint configured to pause or stop execution of the debuggee when a specified event occurs such as the throwing of an exception or a load of a library, and so on.

The method of FIG. 8 also includes sending, by the message router (116) to the requesting debug client, a confirmation (814) of receipt of the request (806) to establish the event notification and receiving, by the requesting client (802), the confirmation. In the example of FIG. 8, the confirmation may be implemented as an application-level message having a CONFIRMATION REPLY message type (816).

The method of FIG. 8 also includes routing the request (806) to the back-end debugger by issuing, to the back-end debugger, the command (818) to establish the event notification. The back-end debugger (118) in the example of FIG. 8 may then execute the issued command including establishing the event notification associated with the particular event and assigning the event notification an event identifier (819). Establishing a notification of such an event may, for example, include setting and enabling a breakpoint, watchpoint, or catchpoint at a particular location in the source code specified by the requesting debug client (802) in the request (806).

The method of FIG. 8 includes returning, by the back-end debugger (118) to the message router (116), the event identifier (819), sending, by the message router (116) to each of the requesting debug client (802) and debug clients (804) identified as intended recipients in the request (806) to establish the event notification, a reply (822) to the request to establish the event notification, and receiving the reply (822) by the requesting client (802) and the intended recipients (804). In the example of FIG. 8, the reply may be implemented as an application-level message having a REPLY REQUEST message type (824), a sender identification (826), a recipient identification (828), an indication of future replies (830), and a payload (832) that includes the event identifier (832) and optionally a description of the event notification.

The method of FIG. 8 also includes: executing (834) the debuggee (120) by the back-end debugger (118); encountering, during the debug session, the particular event (836) associated with the event notification; providing, by the back-end debugger (118) to the message router (116), information (838) describing the particular event and the event identifier (819); and receiving, by the message router from the back-end debugger, the information (838) describing the particular event and the event identifier (819).

The method of FIG. 8 continues with the message router (116) sending, to each of the requesting debug client (802) and debug clients (804) identified as intended recipients in the request (806) to establish the event notification, a reply (840) to the request to establish the event notification and receiving by the requesting client (802) and by the intended recipients (804), the reply (811). In the example of FIG. 8, the reply (811) to the request (806) to establish the event notification may be implemented as an application-level message having an EVENT REPLY message type (842), a sender identification (844), a recipient identification (846), an indication (848) of future replies responsive to the request establish the event notification, and a payload (850) that includes the information (838) describing the particular event and the event identifier (819).

Figure 9:
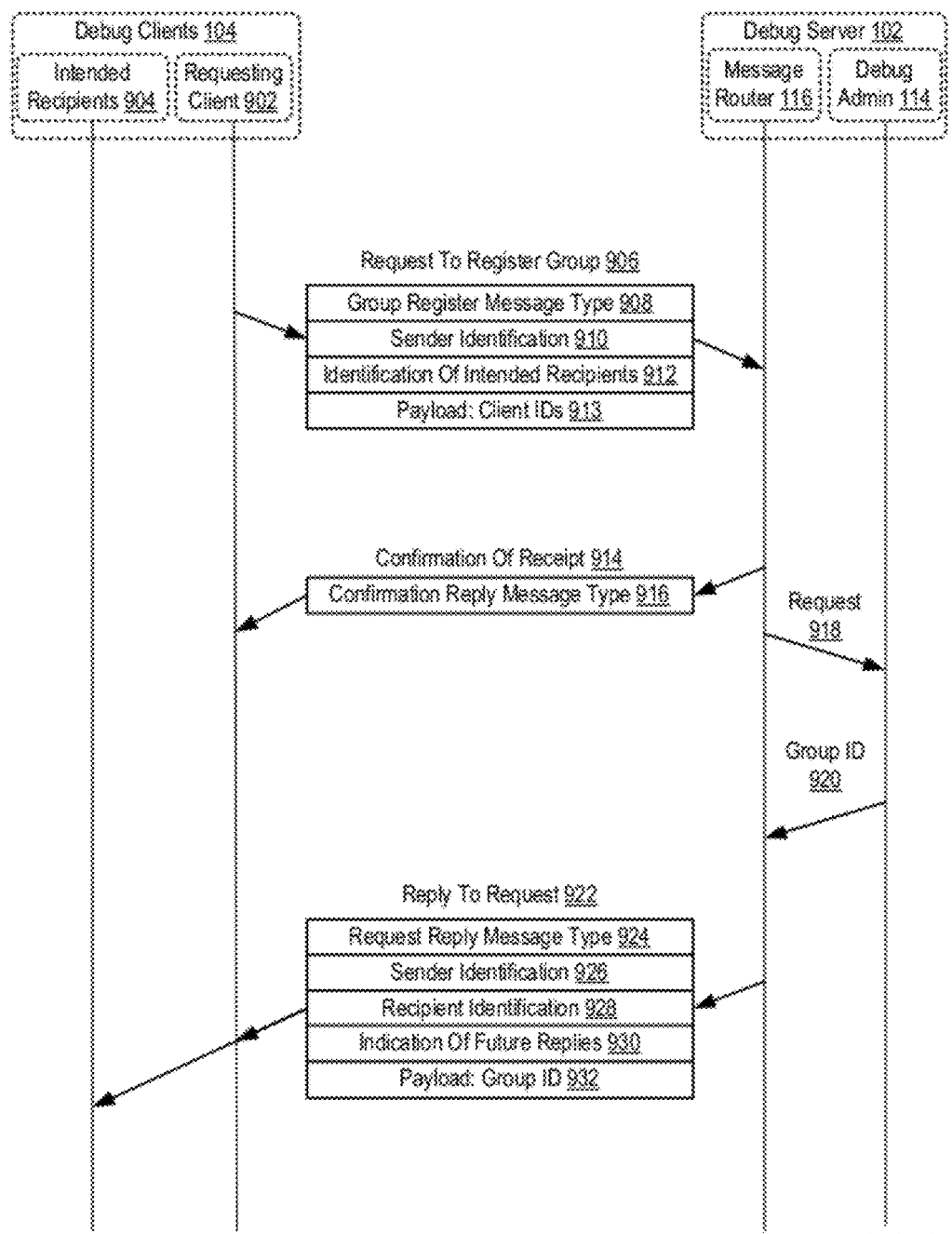
FIG. 9 sets forth a sequence diagram illustrating a further exemplary method of collaborative software debugging in accordance with embodiments of the present invention in which a debug client requests to register a group of debug clients.

FIG. 9 sets forth a sequence diagram illustrating a further exemplary method of collaborative software debugging in accordance with embodiments of the present invention in which a debug client requests to register a group of debug clients. Once a group of debug clients is registered, as explained below, a group identifier is assigned to the group. Rather than listing out multiple client identifiers application-level messages intended for multiple recipients, debug clients may use a group identifier instead. Group identifiers may also be used for privacy or security in debugging—associating a breakpoint, variable, or portion of source code, for example, with a group identifier of a particular group and providing access only to members of the particular group.

The method of FIG. 9 is carried out in a distributed system similar to the system of FIG. 1 which includes a debug server (102), a plurality of debug clients (104), and a data communications network (100 on FIG. 1). The debug server (102) is coupled for data communications to the plurality of debug clients (104) through the data communications network (100). The debug server (102) further includes a debug administrator (114), a message router (116), a back-end debugger (118 on FIG. 1), and a debuggee (120 on FIG. 1).

The method of FIG. 9 includes generating, by a requesting debug client (902), a request (906) to register a group of debug clients, sending the request (906) to the debug server (102), and receiving the request (906) by the message router (116). In the example of FIG. 9, the request (906) may be implemented as an application-level message having a GROUP REGISTER REQUEST message type (908), a sender identification (910), an identification (912) of one or more intended recipients, and a payload (913) that includes client identifiers of a plurality of debug clients to include in the group of debug clients.

The method of FIG. 9 also includes sending, by the message router (116) to the requesting debug client (902), a confirmation (914) of receipt of the request (906) to register the group and receiving the confirmation (914) by the requesting debug client (902). In the example of FIG. 9, the confirmation (914) may be implemented as an application-level message having a CONFIRMATION REPLY message type (916).

The method of FIG. 9 also includes routing the request (906) to the debug administrator (114) and registering, by the debug administrator (114), the group of debug clients, including assigning the group of debug clients a group identifier (920) unique within the debug session. In the method of FIG. 9, the debug administrator (114) returns the group identifier (920) to the message router (116).

The method of FIG. 9 continues by sending, by the message router (116) to each of the requesting debug client (902) and the debug clients identified as intended recipients (904) in the request (906) to register the group of debug clients, a reply (922) to the request (906) and receiving by the requesting debug client (902) and the intended recipients (904), the reply (922). In the example of FIG. 9, the reply (922) may be implemented as an application-level message having a REQUEST REPLY message type (924), a sender identification (926), a recipient identification (928), an indication (930) of future replies responsive to the request to register the group of debug clients, and a payload (932) that includes the assigned group identifier (920).

Figure 10:
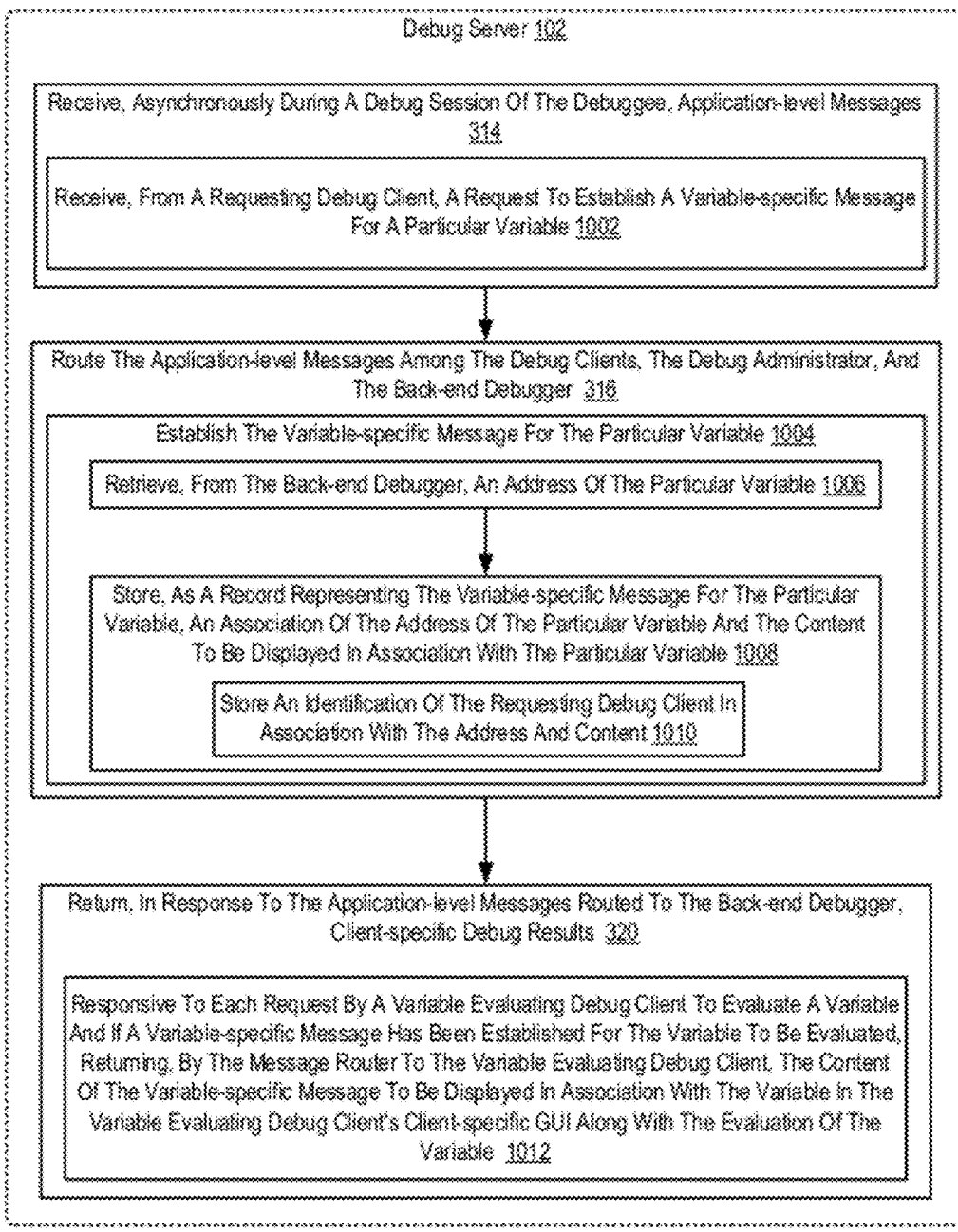
FIG. 10 sets forth a flowchart illustrating a further exemplary method of collaborative software debugging in a distributed system in accordance with embodiments of the present invention.

FIG. 10 sets forth a flowchart illustrating a further exemplary method of collaborative software debugging in a distributed system, such as the example system depicted in FIG. 1, in accordance with embodiments of the present invention. FIG. 10 is directed primarily to operation of the debug server, rather than the debug clients, in carrying out collaborative debugging in accordance with embodiments of the present invention. FIG. 10 is similar to the method of FIG. 3 in that the method of FIG. 10 includes receiving (314) a plurality of application-level messages, routing (316) the application-level messages, and returning (320) client-specific debug results.

The method of FIG. 10 differs from the method of FIG. 3, however, in that in the method of FIG. 10, receiving (314) a plurality of application-level messages includes receiving (1002), from a requesting debug client, a request to establish a variable-specific message for a particular variable. In the example of FIG. 10, the variable-specific message represents content to be displayed in association with the particular variable in a debug client's client-specific graphical user interface ('GUI') upon evaluation of the particular variable. Receiving (314) a plurality of application-level messages includes receiving (1002), from a requesting debug client, a request to establish a variable-specific message for a particular variable may be carried out by receiving, from the requesting debug client, an application-level message having a DISTRIBUTE REQUEST message type and a payload that includes the content of the variable-specific message and an identification of the particular variable.

In the method off FIG. 10, routing (316) the application-level messages includes establishing (1004) the variable-specific message for the particular variable. In the method of FIG. 10, establishing (1004) the variable-specific message for the particular variable is carried out by retrieving (1006), from the back-end debugger, an address of the particular variable and storing (1008), as a record representing the variable-specific message for the particular variable, an association of the address of the particular variable and the content to be displayed in association with the particular variable. In the method of FIG. 10, storing (1008) an association of the address of the particular variable and the content to be displayed includes storing (1010) an identification of the requesting debug client in association with the address and content.

In the method of FIG. 10, returning (320) client-specific debug results includes returning (1012), responsive to each request by a variable evaluating debug client to evaluate a variable and if a variable-specific message has been established for the variable to be evaluated, by the message router to the variable evaluating debug client, the content of the variable-specific message to be displayed in association with the variable in the variable evaluating debug client's client-specific GUI along with the evaluation of the variable. That is, the debug server returns content of a variable specific message to a debug client, upon that debug client requesting an evaluation of the variable. Such variable-specific message content may be returned to the requesting debug client as a payload of an application-level message having a REQUEST REPLY message type.

Figure 11:
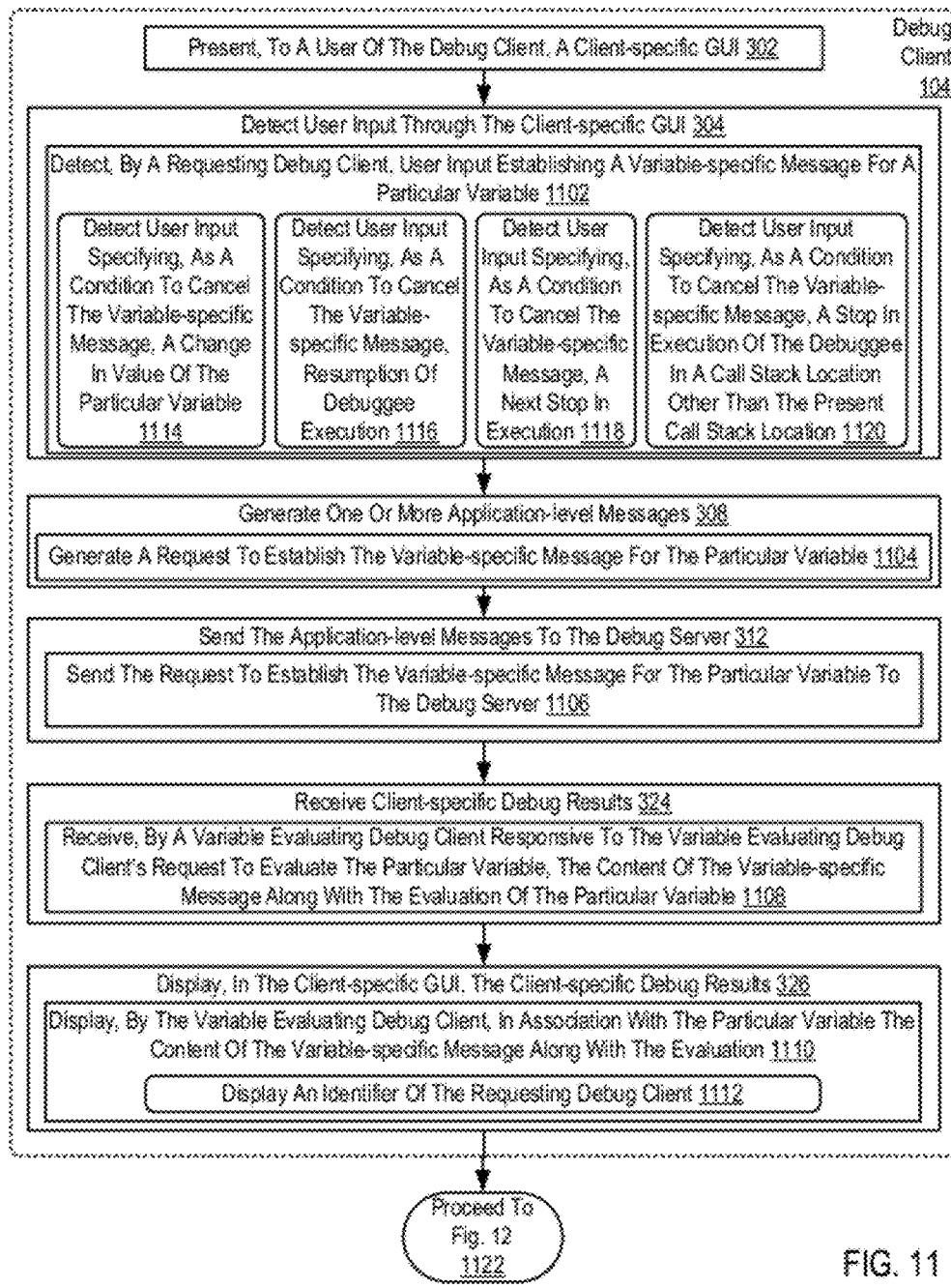
FIG. 11 sets forth a flowchart illustrating a further exemplary method of collaborative software debugging in a distributed system in accordance with embodiments of the present invention.

As mentioned above, FIG. 10 is directed primarily at operation of the debug server (102). By contrast, FIGS. 11 and 12 present a method carried out primarily by the debug clients (104). For further explanation, FIG. 11 sets forth a flowchart illustrating a further exemplary method of collaborative software debugging in a distributed system in accordance with embodiments of the present invention. The method of FIG. 11 is similar to the method of FIG. 3 including, as it does, presenting (302) a client-specific GUI, detecting (304) user input, generating (308) one or more application-level messages, sending (312) the application-level messages to the debug server, receiving (324) client-specific debug results, and displaying (326) the client-specific debug results in the client-specific GUI.

The method of FIG. 11 differs from the method of FIG. 3, however, in that in the method of FIG. 11, detecting (304) user input includes detecting (1102), by a requesting debug client, user input establishing a variable-specific message for a particular variable. In the method of FIG. 11, the variable-specific message includes content to be displayed in association with the particular variable in a debug client's client-specific GUI upon evaluation of the particular variable.

Figure 12:
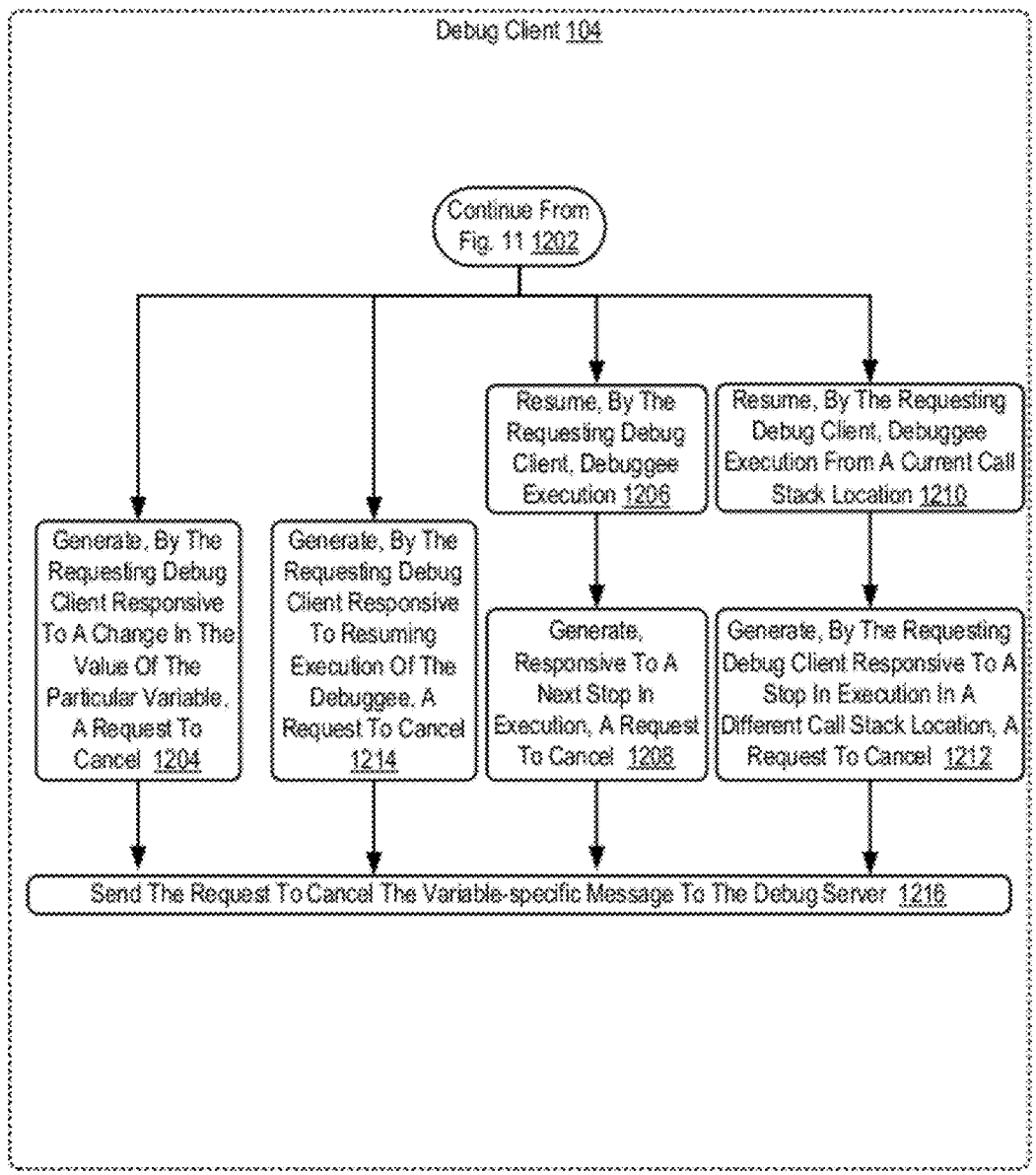
FIG. 12 sets forth a flowchart illustrating a further exemplary method of collaborative software debugging in a distributed system in accordance with embodiments of the present invention.

The method of FIG. 12 include several alternative method of detecting (1102) user input establishing a variable-specific message for a particular variable including: detecting (1114) user input specifying, as a condition to cancel the variable-specific message, a change in value of the particular variable, detecting (1116) user input user input specifying, as a condition to cancel the variable-specific message, resumption of debuggee execution, detecting (1118) user input specifying, as a condition to cancel the variable-specific message, a next stop in execution after execution of the debuggee is resumed, and detecting (1120) user input specifying, as a condition to cancel the variable-specific message, a stop in execution of the debuggee in a call stack location other than the present call stack location.

In the method of FIG. 11, generating (308) one or more application-level messages includes generating (1104) a request to establish the variable-specific message for the particular variable and sending (312) the application-level messages to the debug serer includes sending (1106) the request to establish the variable-specific message for the particular variable to the debug server.

In the method of FIG. 11, receiving (324) client-specific debug results includes receiving (1108), by a variable evaluating debug client responsive to the variable evaluating debug client's request to evaluate the particular variable, the content of the variable-specific message along with the evaluation of the particular variable and displaying (326) the client-specific debug results includes displaying (1110), by the variable evaluating debug client, in association with the particular variable the content of the variable-specific message along with the evaluation of the particular variable. In the method of FIG. 11, displaying (1110) the content of the variable-specific message includes displaying (1112) an identifier of the requesting debug client that established the variable-specific message for the particular variable.

The method of FIG. 11 continues by proceeding (1122) to FIG. 12. FIG. 12 sets forth a flowchart illustrating a further exemplary method of collaborative software debugging in a distributed system in accordance with embodiments of the present invention. The method of FIG. 12 continues (1202) from step (1122) of FIG. 11. The method of FIG. 12 includes four sets of alternative method steps, each of which corresponds to one of the alternative methods (1114, 1116, 1118, 1120) of detecting user input set forth in the method of FIG. 11.

In embodiments in which detecting (1102) user input is carried out by detecting (1114) user input specifying, as a condition to cancel the variable-specific message, a change in value of the particular variable, the method of FIG. 12 continues by generating (1204), by the requesting debug client responsive to a change in the value of the particular variable, a request to cancel the variable-specific message for the particular variable and sending (1216) the request to cancel the variable-specific message to the debug server.

In embodiments in which detecting (1102) user input is carried out by detecting (1116) user input specifying, as a condition to cancel the variable-specific message, resumption of debuggee execution, the method of FIG. 12 continues by generating (1214), by the requesting debug client responsive to resuming execution of the debuggee, a request to cancel the variable-specific message for the particular variable and sending (1216) the request to cancel the variable-specific message to the debug server.

In embodiments in which detecting (1102) user input is carried out by detecting (1118) user input specifying, as a condition to cancel the variable-specific message, a next stop in execution after execution of the debuggee is resumed, the method of FIG. 12 continues by resuming (1206), by the requesting debug client, execution of the debuggee, generating (1208), by the requesting debug client responsive to a next stop in execution, a request to cancel the variable-specific message for the particular variable, and sending (1216) the request to cancel the variable-specific message to the debug server.

In embodiments in which detecting (1102) user input is carried out by detecting (1120) user input specifying, as a condition to cancel the variable-specific message, a stop in execution of the debuggee in a call stack location other than the present call stack location, the method of FIG. 12 continues by resuming (1210), by the requesting debug client, execution of the debuggee from a current call stack location, generating (1212), by the requesting debug client responsive to a stop in execution in a different call stack location, a request to cancel the variable-specific message for the particular variable, and sending (1216) the request to cancel the variable-specific message to the debug server As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart, block diagrams, and sequence diagrams, in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of collaborative software debugging in a distributed system, the distributed system comprising a debug server, a plurality of debug clients, and a data communications network, the debug server coupled for data communications to the plurality of debug clients through the data communications network, the debug server comprising a debug administrator, a message router, a back-end debugger, and a debuggee, the method comprising:

receiving, by the debug server from the debug clients asynchronously during a debug session of the debuggee, a plurality of application-level messages, including receiving, from a requesting debug client, a request to establish a variable-specific message for a particular variable, the variable-specific message comprising an identifier of the requesting debug client, and content to be displayed in association with the particular variable in a debug client's client-specific graphical user interface ('GUI') upon evaluation of the particular variable;

routing, by the message router in accordance with an application-level message passing protocol, the application-level messages among the debug clients, the debug administrator, and the back-end debugger, thereby providing distributed control of the back-end debugger to the debug clients with application-level messages routed to the back-end debugger, including establishing the variable-specific message for the particular variable; and returning, by the debug server to the debug clients, in response to the application-level messages routed to the back-end debugger, client-specific debug results, including responsive to each request by a variable evaluating debug client to evaluate a variable:

determining that a variable-specific message for the variable to be evaluated has been established by a debug client that is not the variable evaluating debug client, and in response to said determining, returning, by the message router to the variable evaluating debug client, the identification of the requesting debug client, and the content of the variable-specific message to display in association with the particular variable along with the evaluation of the particular variable in the variable evaluating debug client's client-specific GUI.

2. The method of claim 1 wherein establishing the variable-specific message for the particular variable further comprises: retrieving, from the back-end debugger, an address of the particular variable; and storing, as a record representing the variable-specific message for the particular variable, an association of the address of the particular variable and the content to be displayed in association with the particular variable.

3. The method of claim 2 wherein storing, as a record representing the variable-specific message for the particular variable, an association of the address of the particular variable and the content to be displayed in association with the particular variable further comprises storing the identification of the requesting debug client in association with the address and content.

4. A method of collaborative software debugging in a distributed system, the distributed system comprising a debug server, a plurality of debug clients, and a data communications network, the debug server coupled for data communications to the plurality of debug clients through the data communications network, the debug server comprising a debug administrator, a message router, a back-end debugger, and a debuggee, the method comprising:
presenting, by a particular debug client to a user of the particular debug client, a client-specific graphical user interface ('GUI'), the client-specific GUI comprising a client-specific display of a debug session of the debuggee;
detecting, by a requesting debug client, user input through a second client-specific GUI, including detecting, by the requesting debug client that is not the particular debug client, user input establishing a variable-specific message for a particular variable, the variable-specific message comprising an identifier of the requesting debug client, and content to display in association with the particular variable in a debug client's client-specific GUI upon evaluation of the particular variable;
generating, by the requesting debug client in dependence upon the detected user input, one or more application-level messages, including generating a request to establish the variable-specific message for the particular variable;
sending, by the requesting debug client, the application-level messages to the debug server, including sending the request to establish the variable-specific message for the particular variable to the debug server;
receiving, by the particular debug client responsive to the application-level messages, client-specific debug results, including responsive to the variable evaluating debug client's request to evaluate a particular variable, receiving the content of the variable-specific message along with the evaluation of the particular variable; and
displaying, by the particular debug client in the client-specific GUI, the client-specific debug results, including displaying, by the particular debug client, the identifier of the requesting debug client, and the content of the variable-specific message in association with the particular variable along with the evaluation of the particular variable.

5. The method of claim 4 wherein:
detecting user input further comprises detecting user input specifying, as a condition to cancel the variable-specific message, a change in value of the particular variable; and
the method further comprises: generating, by the requesting debug client responsive to a change in the value of the particular variable, a request to cancel the variable-specific message for the particular variable and sending the request to cancel the variable-specific message to the debug server.

6. The method of claim 4 wherein:
detecting user input further comprises detecting user input specifying, as a condition to cancel the variable-specific message, resumption of debuggee execution; and
the method further comprises: generating, by the requesting debug client responsive to resuming execution of the debuggee, a request to cancel the variable-specific message for the particular variable and sending the request to cancel the variable-specific message to the debug server.

7. The method of claim 4 wherein:
detecting user input further comprises detecting user input specifying, as a condition to cancel the variable-specific message, a next stop in execution after execution of the debuggee is resumed;
the method further comprises: resuming, by the requesting debug client, execution of the debuggee; generating, by the requesting debug client responsive to a next stop in execution, a request to cancel the variable-specific message for the particular variable; and sending the request to cancel the variable-specific message to the debug server.

8. The method of claim 4 wherein:
detecting user input further comprises detecting user input specifying, as a condition to cancel the variable-specific message, a stop in execution of the debuggee in a call stack location other than the present call stack location;
the method further comprises: resuming, by the requesting debug client, execution of the debuggee from a current call stack location; generating, by the requesting debug client responsive to a stop in execution in a different call stack location, a request to cancel the variable-specific message for the particular variable; and sending the request to cancel the variable-specific message to the debug server.

9. An apparatus for collaborative software debugging in a distributed system, the distributed system comprising a debug server, a plurality of debug clients, and a data communications network, the debug server coupled for data communications to the plurality of debug clients through the data communications network, the debug server comprising a debug administrator, a message router, a back-end debugger, and a debuggee, the apparatus comprising a computer processor, a computer memory operatively coupled to the computer processor, the computer memory having disposed within it computer program instructions that, when executed by the computer processor, cause the apparatus to carry out the steps of:
presenting, by a particular debug client to a user of the particular debug client, a client-specific graphical user interface ('GUI'), the client-specific GUI comprising a client-specific display of a debug session of the debuggee;
detecting, by a requesting debug client, user input through a second client-specific GUI, including detecting, by the requesting debug client that is not the particular debug client, user input establishing a variable-specific message for a particular variable, the variable-specific message comprising an identifier of the requesting debug client, and content to display in association with the particular variable in a debug client's client-specific GUI upon evaluation of the particular variable;

generating, by the requesting debug client in dependence upon the detected user input, one or more application-level messages, including generating a request to establish the variable-specific message for the particular variable;

sending, by the requesting debug client, the application-level messages to the debug server, including sending the request to establish the variable-specific message for the particular variable to the debug server;

receiving, by the particular debug client responsive to the application-level messages, client-specific debug results, including responsive to the variable evaluating debug client's request to evaluate a particular variable, receiving the content of the variable-specific message along with the evaluation of the particular variable; and displaying, by the particular debug client in the client-specific GUI, the client-specific debug results, including displaying, by the particular debug client, the identifier of the requesting debug client, and the content of the variable-specific message in association with the particular variable along with the evaluation of the particular variable.

10. The apparatus of claim 9 wherein:

detecting user input further comprises detecting user input specifying, as a condition to cancel the variable-specific message, a change in value of the particular variable; and the apparatus further comprises computer program instructions that, when executed by the computer processor, cause the apparatus to carry out the steps of: generating, by the requesting debug client responsive to a change in the value of the particular variable, a request to cancel the variable-specific message for the particular variable and sending the request to cancel the variable-specific message to the debug server.

11. The apparatus of claim 9 wherein:

detecting user input further comprises detecting user input specifying, as a condition to cancel the variable-specific message, resumption of debuggee execution; and the apparatus further comprises computer program instructions that, when executed by the computer processor, cause the apparatus to carry out the steps of: generating, by the requesting debug client responsive to resuming execution of the debuggee, a request to cancel the variable-specific message for the particular variable and sending the request to cancel the variable-specific message to the debug server.

12. The apparatus of claim 9 wherein:

detecting user input further comprises detecting user input specifying, as a condition to cancel the variable-specific message, a next stop in execution after execution of the debuggee is resumed;

the apparatus further comprises computer program instructions that, when executed by the computer processor, cause the apparatus to carry out the steps of: resuming, by the requesting debug client, execution of the debuggee; generating, by the requesting debug client responsive to a next stop in execution, a request to cancel the variable-specific message for the particular variable; and sending the request to cancel the variable-specific message to the debug server.

13. The apparatus of claim 9 wherein:

detecting user input further comprises detecting user input specifying, as a condition to cancel the variable-specific message, a stop in execution of the debuggee in a call stack location other than the present call stack location;

the apparatus further comprises computer program instructions that, when executed by the computer processor, cause the apparatus to carry out the steps of: resuming, by the requesting debug client, execution of the debuggee from a current call stack location; generating, by the requesting debug client responsive to a stop in execution in a different call stack location, a request to cancel the variable-specific message for the particular variable; and sending the request to cancel the variable-specific message to the debug server.

14. A computer program product for collaborative software debugging in a distributed system, the distributed system comprising a debug server, a plurality of debug clients, and a data communications network, the debug server coupled for data communications to the plurality of debug clients through the data communications network, the debug server comprising a debug administrator, a message router, a back-end debugger, and a debuggee, the computer program product disposed upon a computer readable storage medium, wherein the computer readable storage medium is not a signal, the computer program product comprising computer program instructions that, when executed by a computer processor of a computer, cause the computer to carry out the steps of:

presenting, by a particular debug client to a user of the particular debug client, a client-specific graphical user interface ('GUI'), the client-specific GUI comprising a client-specific display of a debug session of the debuggee;

detecting, by a requesting debug client, user input through a second client-specific GUI, including detecting, by the requesting debug client that is not the particular debug client, user input establishing a variable-specific message for a particular variable, the variable-specific message comprising an identifier of the requesting debug client, and content to display in association with the particular variable in a debug client's client-specific GUI upon evaluation of the particular variable;

generating, by the requesting debug client in dependence upon the detected user input, one or more application-level messages, including generating a request to establish the variable-specific message for the particular variable;

sending, by the requesting debug client, the application-level messages to the debug server, including sending the request to establish the variable-specific message for the particular variable to the debug server;

receiving, by the particular debug client responsive to the application-level messages, client-specific debug results, including responsive to the variable evaluating debug client's request to evaluate a particular variable, receiving the content of the variable-specific message along with the evaluation of the particular variable; and displaying, by the particular debug client in the client-specific GUI, the client-specific debug results, including displaying, by the particular debug client, the identifier of the requesting debug client, and the content of the variable-specific message in association with the particular variable along with the evaluation of the particular variable.

15. The computer program product of claim 14 wherein:

detecting user input further comprises detecting user input specifying, as a condition to cancel the variable-specific message, a change in value of the particular variable; and the computer program product further comprises computer program instructions that, when executed, cause the computer to carry out the steps of: generating, by the requesting debug client responsive to a change in the value of the particular variable, a request to cancel the variable-specific message for the particular variable and sending the request to cancel the variable-specific message to the debug server.

16. The computer program product of claim 14 wherein:

detecting user input further comprises detecting user input specifying, as a condition to cancel the variable-specific message, resumption of debuggee execution; and the computer program product further comprises computer program instructions that, when executed, cause the computer to carry out the steps of: generating, by the requesting debug client responsive to resuming execution of the debuggee, a request to cancel the variable-specific message for the particular variable and sending the request to cancel the variable-specific message to the debug server.

17. The computer program product of claim 14 wherein:

detecting user input further comprises detecting user input specifying, as a condition to cancel the variable-specific message, a next stop in execution after execution of the debuggee is resumed;

the computer program product further comprises computer program instructions that, when executed, cause the computer to carry out the steps of: resuming, by the requesting debug client, execution of the debuggee; generating, by the requesting debug client responsive to a next stop in execution, a request to cancel the variable-specific message for the particular variable; and sending the request to cancel the variable-specific message to the debug server.

18. The computer program product of claim 14 wherein:

detecting user input further comprises detecting user input specifying, as a condition to cancel the variable-specific message, a stop in execution of the debuggee in a call stack location other than the present call stack location;

the computer program product further comprises computer program instructions that, when executed, cause the computer to carry out the steps of: resuming, by the requesting debug client, execution of the debuggee from a current call stack location;

generating, by the requesting debug client responsive to a stop in execution in a different call stack location, a request to cancel the variable-specific message for the particular variable; and sending the request to cancel the variable-specific message to the debug server.

* * * * *